(12) United States Patent
Okuda et al.

(10) Patent No.: US 11,059,988 B2
(45) Date of Patent: Jul. 13, 2021

(54) INK JET RECORDING METHOD AND RECORDING APPARATUS

(71) Applicant: Seiko Epson Corporation, Tokyo (JP)

(72) Inventors: Ippei Okuda, Shiojiri (JP); Tsuyoshi Sano, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/285,365

(22) Filed: Feb. 26, 2019

(65) Prior Publication Data

US 2019/0264056 A1    Aug. 29, 2019

(30) Foreign Application Priority Data

Feb. 27, 2018   (JP) .............................. JP2018-033504

(51) Int. Cl.
*B41J 2/21*      (2006.01)
*C09D 11/54*     (2014.01)
(Continued)

(52) U.S. Cl.
CPC .................. *C09D 11/54* (2013.01); *B41J 2/15* (2013.01); *B41J 2/2114* (2013.01); *B41J 2/2132* (2013.01);
(Continued)

(58) Field of Classification Search
CPC ......... C09D 11/54; C09D 11/40; C09D 11/38; C09D 11/326; B41J 2/2132; B41J 2/15;
(Continued)

(56) References Cited

U.S. PATENT DOCUMENTS 9,862,203 B2   1/2018  Yano et al.
10,618,309 B2  4/2020  Yano et al.
(Continued)

FOREIGN PATENT DOCUMENTS

CN    105922778 A    9/2016
JP    2013-176972 A  9/2013
(Continued)

OTHER PUBLICATIONS

Extended European Search Report for Patent Application No. EP19158995.1, dated Jun. 28, 2019 (9 pages).

*Primary Examiner* — Yaovi M Ameh
(74) *Attorney, Agent, or Firm* — Harness, Dickey & Pierce, P.L.C.

(57) ABSTRACT

An ink jet recording method is provided for a low or non-absorbable recording medium using a solution containing a colored ink, a clear ink, and an aggregating agent for aggregating constituents in the colored ink. The method includes: causing the solution containing the aggregating agent to adhere to the recording medium; and a main scanning in which the colored and the clear inks are ejected while relative positions of an ink jet head and the recording medium are changed to a main scanning direction, and a sub-scanning in which the relative positions of the ink jet head and the recording medium are changed to a sub-scanning direction. The main scanning involves a region where a recording region in which the colored ink is ejected in the main scanning and a recording region in which the clear ink is ejected in the main scanning overlap one another.

20 Claims, 5 Drawing Sheets

(51) Int. Cl.
  *B41M 5/00* (2006.01)
  *C09D 11/38* (2014.01)
  *C09D 11/40* (2014.01)
  *B41J 2/15* (2006.01)
  *C09D 11/326* (2014.01)
  *B41J 2/01* (2006.01)
(52) U.S. Cl.
  CPC ........... *B41M 5/0017* (2013.01); *C09D 11/38* (2013.01); *C09D 11/40* (2013.01); *B41J 2/01* (2013.01); *C09D 11/326* (2013.01)
(58) Field of Classification Search
  CPC ........ B41J 2/2114; B41J 2/01; B41M 5/0017; B41M 5/00
  See application file for complete search history.

(56) References Cited

U.S. PATENT DOCUMENTS

| | | | | |
|---|---|---|---|---|
| 2010/0165063 | A1* | 7/2010 | Abramovitch | B41J 29/02 347/101 |
| 2010/0259578 | A1* | 10/2010 | Irita | B41M 5/0017 347/21 |
| 2011/0249051 | A1* | 10/2011 | Chretien | B41J 2/17593 347/14 |
| 2012/0050370 | A1 | 3/2012 | Iritani et al. | |
| 2012/0128949 | A1 | 5/2012 | Goto | |
| 2012/0287190 | A1* | 11/2012 | Shimada | B41J 2/2114 347/12 |
| 2013/0201252 | A1 | 8/2013 | Namba | |
| 2013/0335495 | A1* | 12/2013 | Umebayashi | C09D 11/40 347/102 |
| 2014/0043393 | A1 | 2/2014 | Takeuchi | |
| 2015/0191614 | A1* | 7/2015 | Nagashima | C09D 11/106 428/207 |
| 2015/0328911 | A1 | 11/2015 | Garcia Maza et al. | |
| 2016/0250861 | A1 | 9/2016 | Yano et al. | |
| 2016/0289479 | A1* | 10/2016 | Okuda | C09D 11/104 |
| 2018/0079222 | A1 | 3/2018 | Yano et al. | |

FOREIGN PATENT DOCUMENTS

| | | |
|---|---|---|
| JP | 2014-034167 A | 2/2014 |
| JP | 5516222 B2 | 6/2014 |

* cited by examiner

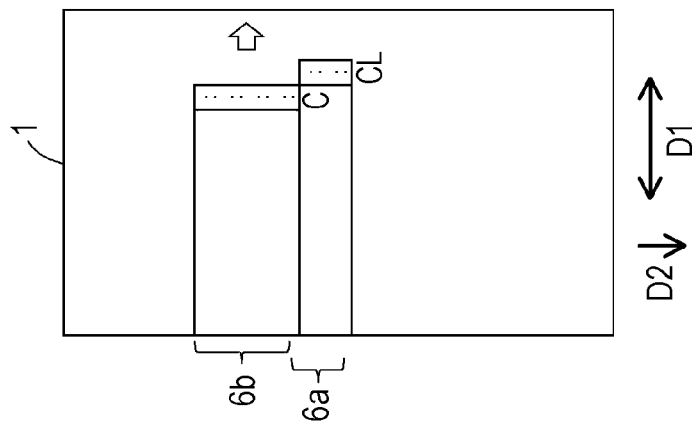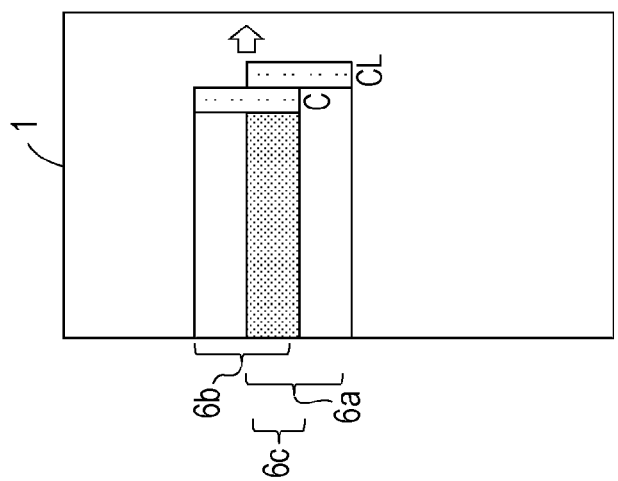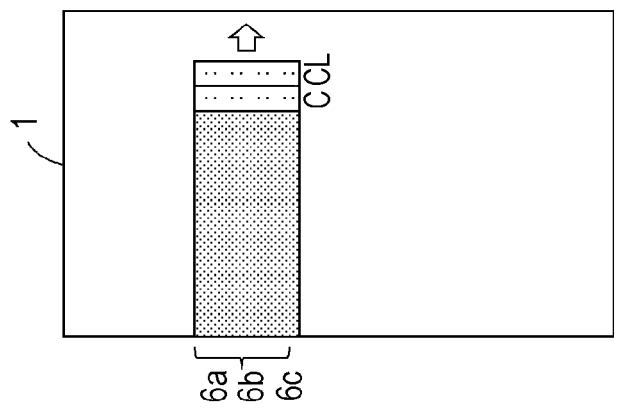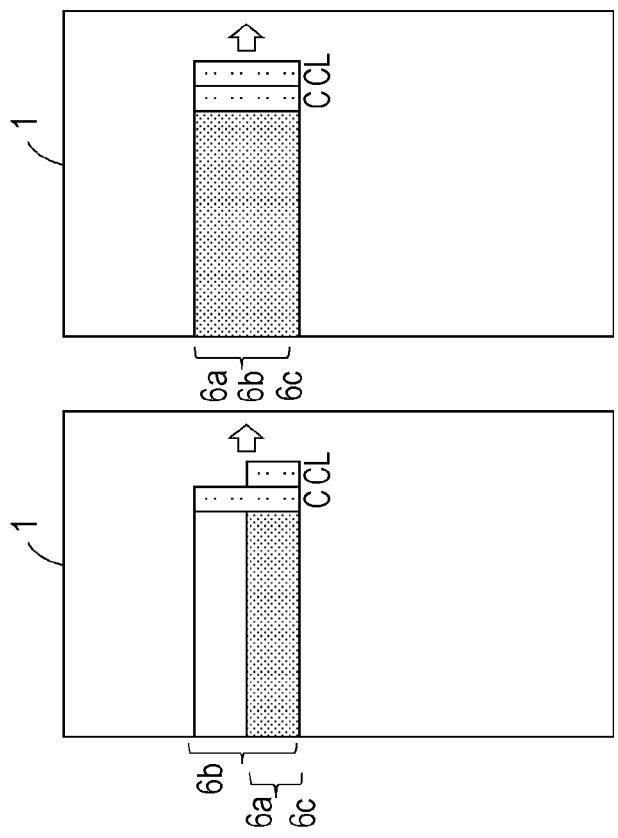

INK JET RECORDING METHOD AND RECORDING APPARATUS

BACKGROUND

1. Technical Field

The present invention relates to an ink jet recording method and a recording apparatus.

2. Related Art

Ink jet recording methods enable recording of high-definition images with relatively simple apparatuses and have been rapidly developed in various fields. In a case in which an ink jet recording method is applied to non-absorbable or low-absorbable recording media, colored ink compositions may cause spreading or mixing at color boundary portions (hereinafter, referred to as bleeding), and image quality tends to be greatly degraded. In the case in which the ink jet recording method is applied to the non-absorbable or low-absorbable recording media, abrasion resistance of images tends to be degraded since ink does not penetrate into the recording media.

An ink jet recording method of applying a processing solution (reaction solution) that contains an aggregating agent for causing coloring constituents in ink to aggregate to a recording medium before causing a colored ink composition to adhere to the recording medium in order to reduce bleeding is known (see JP-A-2014-34167, for example).

An ink jet recording method of causing clear ink (post-processing solution) to adhere after causing a colored ink composition to adhere to a recording medium in order to compensate for abrasion resistance by protecting images is known (see JP-A-2013-176972, for example).

Glossiness of a colored ink composition on a recording medium tends to be degraded in a case in which a processing solution is used in order to improve image quality. There is a problem that glossiness differences depending on locations occur in a case in which the processing solution is used in a serial-type recording method, in particular.

SUMMARY

An advantage of some aspects of the invention is to provide an ink jet recording method that uses clear ink in a case in which image quality is achieved using a processing solution for a non-absorbable or low-absorbable recording medium and that is capable of reducing deviations in glossiness.

The present inventors have intensively conceived the aforementioned problems to solve them. As a result, the inventors have discovered that it is possible to reduce deviations in glossiness by causing a colored ink composition and a clear ink composition to adhere at the same time in an ink jet recording method using a processing solution and a clear ink on a non-absorbable or low-absorbable recording medium.

The invention is performed as follows.

[1] According to an aspect of the invention, there is provided an ink jet recording method that is performed on a low-absorbable or non-absorbable recording medium using a processing solution that contains a colored ink composition containing a coloring material, a clear ink composition containing resin, and an aggregating agent for aggregating constituents in the colored ink composition, the method including: causing the processing solution that contains the aggregating agent to adhere to the recording medium; and causing ink to adhere through main scanning in which the colored ink composition and the clear ink composition are ejected while relative positions of a carriage with an ink jet head mounted thereon and the recording medium are changed to a main scanning direction and sub scanning in which the relative positions of the carriage and the recording medium are changed to a sub scanning direction that intersects the main scanning direction, in which the main scanning that involves a region where a recording region in which the colored ink composition is ejected from the ink jet head in the main scanning and a recording region in which the clear ink composition is ejected in the main scanning overlap with one another is performed.

[2] In the method, the main scanning that involves the overlapping region may further have a region where the recording region in which the clear ink composition is ejected from the ink jet head in the main scanning does not overlap with the recording region in which the colored ink composition is ejected from the ink jet head in the main scanning in the sub scanning direction.

[3] In the method, the overlapping region may be located on a downstream side of the non-overlapping region in the sub scanning direction.

[4] In the method, the number of times of the main scanning performed with the clear ink composition may be less than the number of times of the main scanning performed with the colored ink composition at a specific location in the recording region.

[5] In the method, the clear ink composition may contain wax.

[6] The method may further include: heating the recording medium, in which the causing of the ink to adhere is performed on the heated recording medium.

[7] In the method, the processing solution may be caused to adhere to the recording region, in which the colored ink composition is ejected from the ink jet head in the main scanning, before or in the main scanning.

[8] In the method, the recording region may have a region in which an amount of adhering processing solution is 5 to 20 parts by mass with respect to 100 parts by mass of the adhering colored ink composition.

[9] In the method, the recording region may have a region in which an amount of adhering clear ink composition is 10 to 60 parts by mass with respect to 100 parts by mass of the adhering colored ink composition.

[10] In the method, the colored ink composition may contain a nitrogen-containing solvent.

[11] In the method, the aggregating agent may be a polyvalent metal salt, an organic acid, or a cationic polymer.

[12] In the method, the resin that is contained in the clear ink may contain resin in which an average particle diameter increase rate is equal to or less than 5 times when 0.3M aqueous magnesium sulfate solution is mixed at a mass ratio of 1:1 in a water-mediated solution containing 1% by mass of resin.

[13] In the method, a width of the recording medium in the main scanning direction may be equal to or greater than 50 cm.

[14] According to another aspect of the invention, there is provided a recording apparatus that performs recording by the ink jet recording method, the apparatus including: an ink jet head that ejects the colored ink composition; and an ink jet head that ejects the clear ink composition, in which there is a region where an ejection region of the ink jet head that ejects the colored ink composition and an ejection region of the ink jet head that ejects the clear ink composition overlap with one another in the sub scanning direction.

BRIEF DESCRIPTION OF THE DRAWINGS

The invention will be described with reference to the accompanying drawings, wherein like numbers reference like elements.

FIGS. 6A to 6D are image diagrams of examples of formation of the recording region in the ink jet recording method according to the embodiment.

DESCRIPTION OF EXEMPLARY EMBODIMENTS

Figure 1:
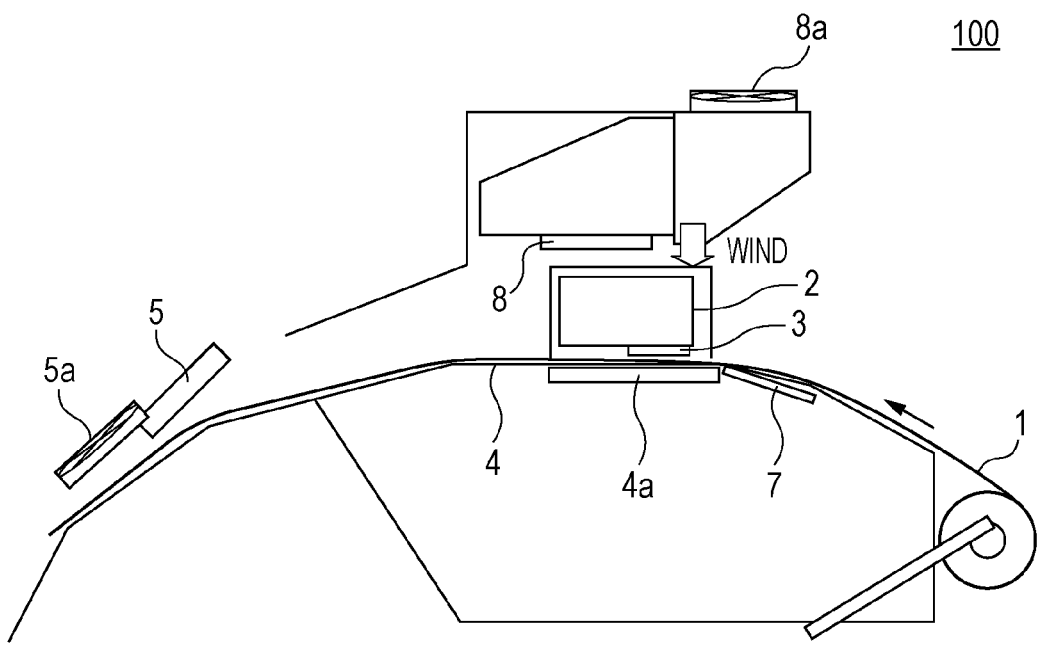
FIG. 1 is a schematic view of an ink jet apparatus that is used in an ink jet recording method according to an embodiment.

Hereinafter, although an embodiment of the invention (hereinafter, referred to as "the embodiment") will be described later with reference to drawings as needed, the invention is not limited thereto, and various modifications can be made without departing from the gist thereof. Note that the same reference numerals will be provided to the same elements in the drawings and repeated description will be omitted. In addition, positional relationships, such as an upper side, a lower side, a left side, or a right side, are on the basis of the positional relationships illustrated in the drawings unless otherwise particularly indicated. Further, dimensional ratios in the drawings are not limited to the ratios illustrated in the drawings.

Hereinafter, a processing solution (reaction solution), a colored ink composition, a clear ink composition, a recording medium, and an ink jet apparatus that are used in an ink jet recording method according to the embodiment will be described, and the ink jet recording method according to the embodiment will then be described. Note that the colored ink composition and the clear ink composition will be simply referred to as ink compositions in a case in which it is not necessary to distinguish the colored ink composition and the clear ink composition from each other.

Processing Solution

The processing solution is a composition that contains an aggregating agent for aggregating at least constituents of the colored ink composition. Further, the processing solution may contain an organic solvent. A water-based processing solution is preferably used. The water-based composition is a composition that contains water as one of main solvent constituents, and the content of water in the composition is preferably equal to or greater than 45% by mass. The same is true for a water-based ink composition or the like. Further, the aggregating agent contained in the processing solution may be an agent for aggregating constituents in the clear ink composition.

It is possible to obtain excellent image quality or the like from the colored ink composition by using the processing solution. Meanwhile, glossiness of an image may be degraded. The reason thereof is considered to be because the constituents of the ink are aggregated by the processing solution and an ink film tends not to be smoothed.

The processing solution is preferably caused to adhere to a recording medium before the colored ink composition is caused to adhere thereto. It is possible to improve image quality by applying the processing solution to the recording medium in advance as compared with a case in which the colored ink composition is caused to adhere directly to the recording medium. Hereinafter, the constituents in the processing solution will be described.

Aggregating Agent

The aggregating agent has a function of aggregating a coloring material along with resin that is contained in the colored ink composition by reacting any of the constituents contained in the colored ink composition, preferably any of the coloring material and the resin. In this manner, it is possible to aggregate the coloring material of ink droplets after landing, to increase viscosity thereof, to suppress interference between the ink droplets, and thereby to form an image with no deviations in concentration.

As the aggregating agent, any one of a polyvalent metal salt, an organic acid, and a cationic polymer is preferably used, either the polyvalent metal salt and the cationic polymer is more preferably used, and the former one is further preferably used. The content of the aggregating agent contained in the processing solution is preferably from 0.5 to 20% by mass, is more preferably from 1 to 15% by mass, and is further preferably from 2 to 10% by mass. In this manner, it is possible to aggregate the constituents of the colored ink composition and to improve image quality.

A polyvalent metal compound is a compound that includes polyvalent metal ions with a valence of two or more and anions. Examples of the polyvalent metal ions with a valence of two or more include $Ca^{2+}$, $Mg^{2+}$, $Cu^{2+}$, $Ni^{2+}$, $Zn^{2+}$, and $Ba^{2+}$. Examples of the anions include Cl—, $NO_3$—, $CH_3COO$—, I—, Br—, and $ClO_3$—. Among the examples, a magnesium salt, a calcium salt, and an aluminum salt are preferably used in terms of a further improvement in the aforementioned aggregating effect.

Examples of the organic acid include a succinic acid, an acetic acid, a propionic acid, and a lactic acid although the examples are not limited thereto.

Preferable examples of the cationic polymer include an amine-based polymer although the examples are not limited thereto. Examples of the amine-based polymer include resin that is generated from an epihalohydrin-amine compound, polyallylamine, and a quaternary salt of polyallylamine. A cationic polymer that is soluble in water and is positively charged in water is exemplified.

The content of the aggregating agent in the processing solution is preferably from 0.5 to 15% by mass. The content of the aggregating agent in the processing solution is from 0.1 to 1.5 mol/kg in terms of molar concentration. The lower limit of the content of the aggregating agent in the processing solution is preferably equal to or greater than 0.3 mol/kg. The upper limit of the content of the aggregating agent in the processing solution is preferably equal to or less than 1.0 mol/kg and is further preferably equal to or less than 0.5 mol/kg. In this manner, it is possible to improve image quality and to achieve a satisfactory balance with other properties such as abrasion resistance.

Organic Solvent with Standard Boiling Point of 180 to 250° C.

The processing solution preferably contains an organic solvent with a standard boiling point of 180 to 250° C. In this manner, it is possible to prevent the organic solvent contained in the processing solution in a head from volatilizing and to prevent nozzle from clogging. Also, it is possible to cause the organic solvent to quickly volatilize when the organic solvent is mixed in the ink compositions on the recording medium and to obtain sufficient image quality on an ink non-absorbable or low-absorbable recording medium.

As the aforementioned organic solvent, a nitrogen-containing solvent may be contained. In this manner, it is possible to stably dissolve the resin in the colored ink composition and to mix the resin in the colored ink composition. Also, the nitrogen-containing solvent has an effect that softening of resin particles contained in the colored ink composition is promoted, and adhesiveness tends to be improved even in a case in which a heating temperature is low.

Although the nitrogen-containing solvent is not particularly limited, examples thereof include a pyrrolidone-based solvent, an imidazolidione-based solvent, an amide ether-based solvent, a pyridine-based solvent, a pyrazine-based solvent, and a pyridine-based solvent. The pyrrolidone-based solvent is preferably used, and examples thereof include 2-pyrrolidone, N-methyl-2-pyrrolidone, and N-ethyl-2-pyrrolidone. One kind of nitrogen-containing solvents may be used alone, or two or more kinds of nitrogen containing solvents may be used together. Among the examples of the nitrogen-containing solvent, an amide-based solvent is preferably used. Examples of the amide-based solvent include cyclic amides and acyclic amides. Examples of the cyclic amides include a pyrrolidone-based amide. Examples of the acyclic amides include an amide ether-based amide with an acyclic structure.

The aforementioned organic solvent may further contain an organic solvent other than the nitrogen-containing solvent. Preferable examples of such an organic solvent include a polyol compound, an alkanediol compound, and a glycol ether compound. Examples of the polyol compound include polyol of alkane that contains four or less carbon atoms and intermolecular condensates of hydroxyl groups of polyol of alkane that contains four or less carbon atoms. The number of carbon atoms is preferably equal to or less than three. The number of condensed molecules in the intermolecular condensates is preferably two to four.

Examples of the alkanediol compound include a diolation product of alkane that contains five or more carbon atoms. The number of carbon atoms is preferably equal to or greater than five and equal to or less than ten and is more preferably equal to or less than seven.

Examples of the glycol ether compound include one obtained by etherifying one or two hydroxyl groups of the alkanediol, and the ether is preferably an alkyl ether or aryl ether, the former being preferred.

Although examples of the aforementioned organic solvent or another organic solvent are not particularly limited, specific examples include alcohols or glycols such as ethylene glycol, diethylene glycol, triethylene glycol, propylene glycol, dipropylene glycol, 1, 3-propanediol, 1, 2-butanediol, 1, 2-pentanediol, 1, 2-hexanediol, 1, 3-butanediol, 1, 4-butanediol, 1, 5-pentanediol, 1, 6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol. One kind of other solvents may be used alone, or two or more kinds of other solvents may be used together.

The content of the organic solvent with the standard boiling point of 180 to 250° C. is preferably equal to or greater than 3.0% by mass, more preferably equal to or greater than 5.0% by mass and equal to or less than 35% by mass, further preferably equal to or greater than 10% by mass and equal to or less than 35% by mass, and yet further preferably equal to or greater than 15% by mass and equal to or less than 30% by mass with respect to the total amount of the processing solution. In this manner, the degree of aggregation of the constituents of the colored ink composition becomes appropriate when the colored ink composition and the processing solution are mixed. Also, it is possible to quickly cause the organic solvent to volatilize when the organic solvent is mixed in the ink compositions on the recording medium and to obtain sufficient image quality on an ink non-absorbable or low-absorbable recording medium.

Organic Solvent with Standard Boiling Point of Greater than 280° C.

The content of the organic solvent of a polyol compound with a standard boiling point of greater than 280° C. in the processing solution is preferably equal to or less than 2% by mass. If the content of the organic solvent in the processing solution falls within the aforementioned range, dryness of the processing solution on the recording medium is not significantly degraded, which is favorable. As a result, bleeding of the image is reduced, and excellent abrasion resistance is achieved on various recording medium, particularly, on an ink non-absorbable or low-absorbable recording medium.

The content of the organic solvent of the polyol compound with a standard boiling point of greater than 280° C. in the processing solution is more preferably equal to or less than 1% by mass, is further more preferably equal to or less than 0.5% by mass, is particularly preferably equal to or less than 0.1% by mass, and is still more preferably equal to or less than 0.05% by mass with respect to the total mass of the ink compositions. The lower limit of the content is 0% by mass. If the content falls within the aforementioned range, degradation of abrasion resistance of a recorded product due to the organic solvent with the standard boiling point of greater than 280° C. is suppressed, and it is possible to obtain a recorded product with excellent abrasion resistance.

Further, it is also further preferable that the content of the organic solvent (not limited to the polyol compound) with the standard boiling point of greater than 280° C. in the processing solution fall within the aforementioned range in terms of the aforementioned point.

Surfactant

The processing solution preferably contains a surfactant. Although the surfactant is not particularly limited, examples thereof include an acetylene glycol-based surfactant, a fluorine-based surfactant, and a silicone-based surfactant. Among the examples, the acetylene glycol-based surfactant and a silicone-based surfactant are preferably used.

The content of the surfactant is preferably from 0.1 to 2.0% by mass, is more preferably from 0.1 to 1.7% by mass, and is further preferably from 0.1 to 1.5% by mass with respect to 100% by mass of the processing solution.

Water

The processing solution also contains water. Examples of water include ion include pure water such as ion-exchanged water, ultrafiltrated water, reverse osmosis water, and distilled water and ultrapure water from which ionic impurities have been removed as much as possible. If water sterilized by performing ultraviolet irradiation, adding hydrogen peroxide, or the like is used, it is possible to prevent mold or bacteria from being generated in a case in which a pigment dispersion and ink using the pigment dispersion are stored for a long period of time.

Although the content of water is not particularly limited, the content of water in the processing solution is preferably larger than the content of the organic solvent. The content of water is preferably from 40 to 95% by mass, is more preferably from 45 to 90% by mass, and is further preferably from 50 to 80% by mass with respect to 100% by mass of the processing solution.

The processing solution may contain constituents such as resin, a sizing agent (for example, a starch substance, a cellulose-based solution, polysaccharides, protein, a water-soluble polymer, or the like), a pH adjuster, an antiseptic agent, and a fungicide.

Colored Ink Composition

The colored ink composition according to the embodiment is a water-based ink composition that contains a coloring material. The colored ink composition according to the embodiment is preferably a water-based ink composition that contains a coloring material, resin particles, a wax, and an organic solvent.

Coloring Material

Although a pigment or a dye can be used as the coloring material, the pigment is preferably used. Although the pigment is not particularly limited, examples thereof include the following examples.

Although a black pigment is not particularly limited, examples thereof include No. 2300, No. 900, MCF88, No. 33, No. 40, No. 45, No. 52, MA7, MA8, MA100, No. 2200B and the like (all of which are manufactured by Mitsubishi Chemical Corporation), Raven 5750, Raven 5250, Raven 5000, Raven 3500, Raven 1255, Raven 700, and the like (all of which are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.), Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, Special Black 4 and the like (all of which are manufactured by Degussa).

Although a white pigment is not particularly limited, examples thereof include C.I. Pigment White 6, 18, and 21, white inorganic pigments such as titanium oxide, zinc oxide, zinc sulfide, antimony trioxide, magnesium oxide, and zirconium oxide. A white organic pigment such as white hollow resin particles and polymer particles can also be used in addition to the white inorganic pigment.

Although a pigment that is used in yellow ink is not particularly limited, examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Although a magenta pigment is not particularly limited, examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Although a cyan pigment is not particularly limited, examples thereof include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Although pigments that are used in color ink other than magenta, cyan, and yellow ink are not particularly limited, examples thereof include C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63.

Although a pearl pigment is not particularly limited, examples thereof include a pigment that has pearly glossiness or interference glossiness, such as titanium dioxide coated mica, argentine, or bismuth oxychloride.

Although a metallic pigment is not particularly limited, examples thereof include particles of aluminum, silver, gold, platinum, nickel, chromium, tin, zinc, indium, titanium, or copper alone of alloy thereof.

The content of the pigment is preferably from 0.4 to 12% by mass, is more preferably from 1 to 8% by mass, and is further preferably from 2 to 5% by mass with respect to 100% by mass of the ink composition. A pigment with an average particle diameter increase rate of greater than five times is preferably contained. The average particle diameter increase rate of the pigment is obtained by preparing 1% by mass of a pigment dispersion, which is used to prepare ink, diluted with water in terms of solid content and using it for a test that is similar to that for an average particle diameter increase rate of resin particles, which will be described later. The average particle diameter increase rate of the pigment is preferably equal to or greater than six times, is more preferably equal to or greater than seven times, and is further preferably equal to or greater than eight times. Although the upper limit thereof is not limited, the upper limit is equal to or less than twenty times, for example. The average particle diameter increase rate of the pigment can be increased by increasing the amount of an acidic group, such as a carboxyl group or a sulfone group to be introduced to the surfaces of the pigment particles or increasing the amount of the acidic group in resin for dispersing the pigment, or the like.

Resin Particles

The ink compositions according to the embodiment may contain resin particles. In this manner, it is possible to improve fixability and abrasion resistance of an image. The resin particles can be used in a form of a resin emulsion or the like.

Although the type of resin is not particularly limited, examples thereof include (meth)acrylic acid, (meth)acrylic acid ester, acrylonitrile, cyanoacrylate, acryl amide (all of which will be referred to as acrylic monomers), a single polymer or a copolymer of olefin, styrene, vinyl acetate, vinyl chloride, vinyl alcohol, vinyl ether, vinyl pyrrolidone, vinyl pyridine, vinyl carbazole, vinyl imidazole, and vinylidene chloride, fluorine resin, natural resin, urethane resin, and polyester resin.

Resin that uses at least an acrylic monomer as a constituent thereof (a monomer constituent used to polymerize resin) is regarded as acrylic resin. The acrylic resin may be a copolymer of an acrylic monomer and a monomer other than the acrylic monomer. The acrylic resin is a single polymer or a copolymer that uses at least the acrylic monomer. Among these examples, a vinyl-acrylic copolymer that uses an acrylic monomer and a vinyl-based monomer is preferably used, a styrene-acryl copolymer that uses styrene from among vinyl-based monomers is more preferably used, and copolymer resin that uses at least styrene and (meth)acrylic acid is further preferably used.

Among the examples of resin, acrylic resin, urethane resin, or polyester resin is preferably used, and the acrylic resin is more preferably used.

Note that the aforementioned copolymer may be in any of forms of a random copolymer, a block copolymer, an alternating copolymer, and a graft copolymer.

Although the aforementioned resin is not particularly limited, the resin can be obtained by a preparation method described below, for example, or a plurality of methods may be combined as needed. Examples of the preparation method include a method of mixing and polymerizing (emulsion polymerization) a polymerization catalyst (polymerization initiator) and a dispersing agent in a monomer of constituents included in desired resin, a method of mixing a solution obtained by dissolving resin with a hydrophilic part in a water-soluble organic solvent in water and then removing the water-soluble organic solvent through distillation, and a method of mixing a solution obtained by dissolving resin in a non-water-soluble organic solvent in an aqueous solution along with a dispersing agent.

The content of the resin is preferably equal to or greater than 1% by mass and equal to or less than 15% by mass, and is more preferably equal to or greater than 2% by mass and equal to or less than 10% by mass, and is further preferably equal to or greater than 3% by mass and equal to or less than 7% by mass. By setting the content of the resin within the aforementioned range, it is possible to improve abrasion resistance, to stably dissolve the resin, and to improve ejection stability.

Wax

The colored ink composition may contain a wax. There is a probability that resin particles are aggregated and fixed with evaporation of moisture, this leads to clogging of nozzles in the recording head, and stable ejection is prevented, in a case in which a recording head is heated. Meanwhile, if the wax is used together, aggregation of polymer particles when the moisture is evaporated is suppressed. In this manner, it is possible to suppress ejection failure and clogging due to the fixation of the resin particles to the nozzles of the recording head and thus to obtain a colored ink composition with excellent recording stability. Also, the wax prevents a coated film of the resin particles from becoming excessively brittle during high-temperature recording. Therefore, an ink composition with abrasion resistance that tends not to be degraded even at the time of high-temperature recording is obtained.

A melting point of the wax is equal to or greater than 70° C. and less than 110° C. and is more preferably equal to or greater than 80° C. and equal to or less than 110° C. If the melting point falls with the aforementioned range, it is possible to obtain a recorded product with more excellent recording stability and abrasion resistance that tends not to be degraded even at the time of high-temperature recording. Note that the melting point can be measured by a differential scanning calorimeter (DSC). The melting point of the wax can be controlled by adjusting a ratio of a plurality of constituent units that are included in the wax, for example.

The wax contains a polyethylene wax. Although the polyethylene wax with a melting point of equal to or greater than 70° C. and less than 110° C. is not particularly limited, examples thereof include AQUACER 515 polyolefin wax (manufactured by BYK), Nopcote PEM-17 (manufactured by San Nopco), Polylon L787 and Polylon L788 (all of which are manufactured by Chukyo Yushi), and Chemipal W4005 (manufactured by Mitsui Chemicals). The polyethylene wax with a melting point of equal to or greater than 70° C. and less than 110° C. may be synthesized by an ordinary method.

One kind of the waxes may be used alone, or two or more kinds of waxes may be used in combination.

The amount of the wax added in the ink compositions is preferably from 0.1 to 5.0% by mass and is more preferably from 1.0 to 2.0% by mass with reference to the total mass of the ink compositions. If the amount of addition falls within the aforementioned range, excellent recording stability is achieved, and abrasion resistance further tends not to be degraded even at the time of high-temperature recording.

Organic Solvent with Standard Boiling Point of 180 to 250° C.

The colored ink composition may contain an organic solvent. As the organic solvent, each organic solvent that may be contained in the aforementioned processing solution may be contained independently from the one contained in the processing solution. Alto, each organic solvent that may be contained in the processing solution may be contained independently from the content of the organic solvent contained in the processing solution such that the content corresponds to the content thereof contained in the ink composition.

The colored ink composition preferably contains an organic solvent with a standard boiling point of 180 to 250° C. In this manner, it is possible to prevent the organic solvent contained in the processing solution in the head to volatilize and to prevent the nozzles from clogging. Also, it is possible to cause the organic solvent to quickly volatilize when the ink adheres to the recording medium and to obtain sufficient image quality on an ink non-absorbable or low-absorbable recording medium.

As the aforementioned organic solvent, a nitrogen-containing solvent may be contained. In this manner, it is possible to stably dissolve the resin in the colored ink composition and to cause the resin to be mixed with the colored ink composition. Also, the nitrogen-containing solvent has an effect that softening of resin particles contained in the colored ink composition is prompted, and adhesiveness tends to be improved even in a case in which a heating temperature is low. As the organic solvent that contains the nitrogen-containing solvent, similar organic solvents listed as those for the processing solution can be used.

The content of the organic solvent with the standard boiling point from 180 to 250° C. is preferably equal to or greater than 3.0% by mass, is more preferably equal to or greater than 5.0% by mass and equal to or less than 35% by mass, and is further preferably equal to or greater than 10% by mass and equal to or less than 35% by mass with respect to the total amount of the ink. In this manner, it is possible to cause the organic solvent to quickly volatilize when the ink adheres to the recording medium and to obtain sufficient image quality on an ink non-absorbable or low-absorbable recording medium.

Organic Solvent with Boiling Point of Greater than 280° C.

In the colored ink composition according to the embodiment, the content of the organic solvent of the polyol compound with a standard boiling point of greater than 280°

C. is preferably equal to or less than 5% by mass. If the content of the organic solvent in the colored ink composition falls with the aforementioned range, dryness of the ink on the recording medium is not significantly degraded, and as a result, it is possible to reduce deviations in darkness of an image on various recording media, particularly, on an ink non-absorbable or low-absorbable recording medium and to achieve excellent ink fixation.

The content of the organic solvent of the polyol compound with the standard boiling point of greater than 280° C. in the colored ink composition is preferably equal to or less than 2% by mass, is more preferably equal to or less than 1% by mass, is further preferably equal to or less than 0.5% by mass, is particularly preferably equal to or less than 0.1% by mass, and is yet further preferably equal to or less than 0.05% by mass with respect to the total amount of the colored ink composition. The lower limit of the content is 0% by mass. If the content falls within the aforementioned range, degradation of abrasion resistance of a recorded product using the ink composition due to the organic solvent with the standard boiling point of greater than 280° C. is suppressed, and it is possible to obtain an excellent recorded product with excellent abrasion resistance.

Further, it is further preferable that the content of the organic solvent with the standard boiling point of greater than 280° C. (not limited to the polyol compound) fall within the aforementioned range in terms of the aforementioned point.

Surfactant

The colored ink composition according to the embodiment preferably contains a surfactant. Although the surfactant is not particularly limited, examples thereof include an acetylene glycol-based surfactant, a fluorine-based surfactant, and a silicone-based surfactant. Among the examples, the acetylene glycol-based surfactant and the silicone-based surfactant are preferably used. Specific examples of an available surfactant is as described above for the processing solution.

The content of the surfactant is preferably from 0.1 to 2.0% by mass, is more preferably from 0.1 to 1.7% by mass, and is further preferably from 0.1 to 1.5% by mass with respect to 100% by mass of the colored ink composition. If the content of the surfactant is equal to or less than 2.0% by mass, abrasion resistance tends to be further improved. Also, if the content of the surfactant is equal to or greater than 0.1% by mass, filling properties of the obtained recorded product are further improved, and ejection stability tends to be further improved.

Water

The ink composition according to the embodiment contains water. Examples of water include ion include pure water such as ion-exchanged water, ultrafiltrated water, reverse osmosis water, and distilled water and ultrapure water from which ionic impurities have been removed as much as possible. If water sterilized by performing ultraviolet irradiation, adding hydrogen peroxide, or the like is used, it is possible to prevent mold or bacteria from being generated in a case in which a pigment dispersion and ink using the pigment dispersion are stored for a long period of time.

Although the content of water is not particularly limited, the content of water is preferably larger than the content of the organic solvent in the invention. The ink is so-called "water-based ink", and at least water is contained as a main constituent in solvent constituents contained in the ink. The content of water is preferably from 40 to 95% by mass, is more preferably from 45 to 90% by mass, and is further preferably from 50 to 80% by mass with respect to 100% by mass of the water-based ink composition.

Other Constituents

Various additives such as solubilizer, a viscosity adjuster, a pH adjuster, an antioxidant, an antiseptic agent, a fungicide, and a corrosion inhibitor in order to satisfactorily maintain storing stability and ejection stability from the head and a chelating agent for capturing metal ions that affect dispersion can be appropriately added to the ink used in the embodiment.

Clear Ink Composition

The clear ink composition according to the embodiment contains resin. The clear ink composition according to the embodiment preferably contains resin particles as resin. The clear ink composition preferably contains a wax and an organic solvent. The clear ink composition is preferably a water-based ink composition. The clear ink is not ink that is used to color the recording medium but is ink that is used for another purpose. Examples of another purpose include improvement in properties such as abrasion resistance of a recorded product, adjustment of glossiness on the recording medium, and improvement of fixability of color ink and coloring properties, and the purpose is not limited thereto. The content of the coloring material in the clear ink composition is preferably equal to or less than 0.2% by mass, is more preferably equal to or less than 0.1% by mass, and is further preferably equal to or less than 0.05% by mass, and the lower limit of the content may be 0% by mass.

As for constituents that are or may be contained other than the coloring material or constituents in the clear ink composition, the respective constituents that are similar to the respective constituents that may be contained in the aforementioned processing solution and the colored ink composition may be contained independently from those contained in the processing solution and the colored ink composition. The respective constituents contained in the clear ink composition may be contained independently from the content of the constituents contained in the processing solution and the colored ink composition such that the content thereof corresponds to the content of the respective constituents that may be contained in the processing solution and the colored ink composition. The content of constituents among or other than these constituents contained in the clear ink composition will be described below.

Resin Particles

Resin that is contained in the clear ink composition may be for compensating for protecting an image and compensating for abrasion resistance. The resin of a type that is similar to that of the resin that may be contained in the aforementioned colored ink composition can be used independently from the resin that is contained in the colored ink composition. The resin is preferably resin particles. The resin contained in the clear ink preferably contains resin with a small average particle diameter increase rate when 0.3M aqueous magnesium sulfate solution is mixed in a water-mediated solution that contains 1% by mass of resin at a mass ratio of 1:1.

Specifically, a change in an average particle diameter in the resin is measured when the 0.3M aqueous magnesium sulfate solution and a resin solution obtained by dispersing or dissolving 1% by mass of resin in water are mixed at a mass ratio of 1:1 and are then stirred for one minute in an environment at 25° C. The average particle diameter increase rate is calculated by the following equation from an average particle diameter measured before the mixing and an average particle diameter measured after the mixing.

Average particle diameter increase rate(times)=average particle diameter after mixing/average particle diameter before mixing The average particle diameters are on the basis of the volume. As a measurement method, it is possible to perform the measurement using a particle size distribution measurement device that employs a dynamic light scattering theory as a measurement principle, for example. Examples of such a particle size distribution measurement device include "Microtrac UPA" manufactured by Nikkiso, for example. The average particle diameters can be measured using D50.

The resin is preferably low-reactive resin. Since films are formed such that the coloring material settles (react) first and is then covered with fixation resin when the ink compositions react with a reaction solution and forms an image by using low-reactive resin, it is possible to form smooth films and to further improve abrasion resistance. The resin that is used in the clear ink is further preferable in terms of this point.

The particle diameter increase rate is preferably equal to or less than seven times, is more preferably equal to or less than five times, is further preferably equal to or less than two times, is further preferably equal to or less than 1.5 times, and is particularly preferably equal to or less than 1.3 times. Since the particle diameter increase rate is preferably lower, the lower limit is not limited. However, the lower limit is one time (the same as that before the mixing), for example.

Reactivity of resin can be adjusted by adjusting a type and a configuration ratio of a monomer used in synthesizing the resin or by adjusting a type or amount of use of an emulsifier in a case in which the resin is emulsion-dispersed. It is possible to reduce the reactivity of the resin by reducing an acid value of the resin or increasing the amount of the emulsifier used.

The content of the resin contained in the clear ink is preferably equal to or greater than 1% by mass and equal to or less than 15% by mass, is more preferably equal to or greater than 2% by mass and equal to or less than 10% by mass, and is further preferably equal to or greater than 3% by mass and equal to or less than 7% by mass with respect to the total amount of the ink. By setting the content of the resin within the aforementioned range, it is possible to improve abrasion resistance, to stably dissolve the resin, and to improve ejection stability.

Wax

The clear ink composition may contain a wax. By containing a wax, it is possible to smooth the ink film and to improve glossiness in addition to the advantages described above for the colored ink composition. A preferable range of the melting point of the wax and the type of the wax are as described above for the colored ink composition. The amount of the wax added to the clear ink composition is preferably from 0.1 to 5.0% by mass and is more preferably from 1.0 to 2.0% by mass with respect to the total mass of the ink composition. The amount of the wax added to the clear ink composition is preferably larger than that added to the colored ink composition.

Organic Solvent

The clear ink composition may contain an organic solvent with a standard boiling point of 180 to 250° C. from a viewpoint that is similar to that of the colored ink composition. Types of the organic solvent with the standard boiling point of 180 to 250° C. are as described above for the colored ink composition.

The content of the organic solvent with the standard boiling point of 180 to 250° C. is preferably equal to or greater than 3.0% by mass, is more preferably equal to or greater than 5.0% by mass and is equal to or less than 35% by mass, and is further preferably equal to or greater than 10% by mass and equal to or less than 35% by mass with respect to the total amount of the ink. In this manner, it is possible to cause the organic solvent to quickly volatilize when the ink adheres to the recording medium and to obtain sufficient image quality on an ink non-absorbable or low-absorbable recording medium.

Organic Solvent with Boiling Point of greater than 280° C.

The content of the organic solvent of the polyol compound with the standard boiling point of greater than 280° C. in the clear ink composition is equal to or less than 5% by mass, is preferably equal to or less than 2% by mass, is more preferably equal to or less than 1% by mass, is further preferably equal to or less than 0.5% by mass, is particularly preferably equal to or less than 0.1% by mass, and is further preferably equal to or less than 0.05% by mass with respect to the total mass of the ink composition. The lower limit of the content is 0% by mass. If the content falls within the aforementioned range, degradation of abrasion resistance of a recorded product using the ink composition due to the organic solvent with the standard boiling point of greater than 280° C. is suppressed, and it is possible to obtain a recorded product with more excellent abrasion resistance. The content of the organic solvent with the standard boiling point of greater than 280° C. (not limited to the polyol compound) preferably falls within the aforementioned range in terms of the aforementioned point.

Water

Although the content of water in the clear ink composition is not particularly limited, the content of water is preferably larger than that of the organic solvent. Also, the ink is so-called "water-based ink", and at least water is contained in a main constituent of solvent constituents contained in the ink. The content of water is preferably from 40 to 95% by mass, is more preferably from 45 to 90% by mass, and is further preferably from 50 to 80% by mass with respect to 100% by mass of the ink composition.

Other Constituents

Various additives such as a surfactant, a solubilizer, a viscosity adjuster, a pH adjuster, an antioxidant, an antiseptic agent, a fungicide, and a corrosion inhibitor, and a chelating agent for capturing metal ions that affect dispersion can appropriately be added to the clear ink similarly to the colored ink composition.

Recording Apparatus

The recording apparatus according to the embodiment is a recording apparatus that performs recording by the recording method according to the embodiment. The recording apparatus according to the embodiment includes an ink jet head that ejects the aforementioned colored ink composition and an ink jet head that ejects the clear ink composition and has an ejection region from which the ink jet head that ejects the colored ink composition and the ink jet head that ejects the clear ink composition overlap with one another in a sub scanning direction. The recording apparatus further preferably includes a carriage having the ink jet head that ejects the colored ink composition and the ink jet head that ejects the clear ink composition as described above. Hereinafter, an example of a configuration of the recording apparatus according to the embodiment will be described.

FIG. 1 illustrates an outline sectional view of an example of the recording apparatus (ink jet apparatus) that is used in the ink jet recording method according to the embodiment. As illustrated in FIG. 1, an ink jet apparatus 100 includes a carriage 2, an ink jet head 3, a platen 4, a platen heater 4a, a post-heater 5, a cooling fan 5a, a pre-heater 7, an IR heater 8, and a ventilation fan 8a. Note that the cooling fan 5a, the pre-heater 7, the IR heater 8, and the ventilation fan 8a are used as needed and can be omitted.

The ink jet head 3 is mounted on the carriage 2 and includes a plurality of nozzle arrays for ejecting the colored ink composition and the clear ink composition. The respective nozzle arrays include a plurality of nozzle holes aligned therein. The ink jet recording apparatus 1 is a so-called serial-type ink jet recording apparatus. The serial-type ink jet recording apparatus means an ink jet recording apparatus in which the ink jet head 3 is mounted on the carriage 2 that moves in a predetermined direction and liquid droplets are ejected onto a recording medium by the ink jet head 3 moving with movement of the carriage 2 in a main scanning direction. The carriage 2 performs main scanning to cause ink to adhere to the recording medium by ejecting the ink from the ink jet head 3 mounted on the carriage 2 while moving in the main scanning direction that corresponds to a front side-further side direction in the drawing.

The platen heater 4a is used when the recording medium is heated in a process of causing the ink compositions to adhere. It is possible to heat the recording medium on a side opposite to the ink jet head 3 by using the platen heater 4a. In this manner, the ink jet head 3 relatively tends not to be heated.

The post-heater 5 is for drying and solidifying the ink compositions recorded on a recording medium 1. Moisture and the like contained in the ink composition are quickly evaporated and fly, and a film is formed with polymer particles contained in the ink compositions by the post heater 5 heating the recording medium 1 on which an image has been recorded. In this manner, an ink dried product is fixed (bonded) to the recording medium, and an image with excellent abrasion resistance and high image quality can be obtained in a short time.

The cooling fan 5a is used to form a coated film with satisfactory adhesiveness on the recording medium by cooling the ink composition on the recording medium after drying the recording medium by the post-heater 5.

The pre-heater 7 is for heating the recording medium in advance (pre-heating) before the ink composition is ejected to the recording medium.

The IR heater 8 is used as needed and is used to heat the recording medium from the side of the ink jet head 3 in the process of causing the ink compositions to adhere. In this manner, the ink jet head 3 is also heated at the same time, and the temperature can be raised without being affected by the thickness of the recording medium as compared with a case in which the heating is performed from the rear surface of the recording medium, such as a case in which the platen heater 4a is used. The ventilation fan 8a is used to more efficiently dry the ink compositions that has adhered to the recording medium 1.

Figure 5:
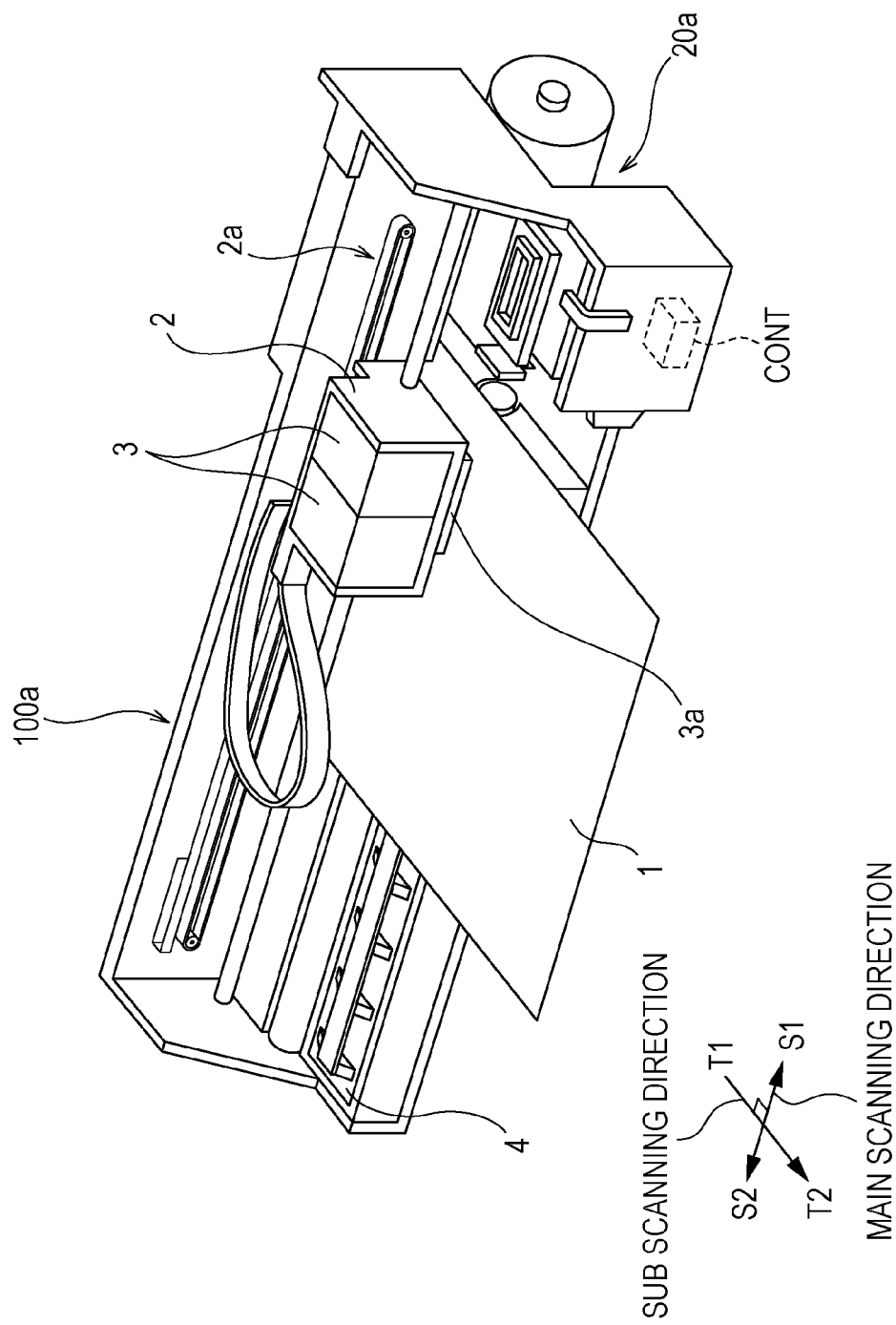
FIG. 5 is a schematic view of a part of the ink jet apparatus that is used in the ink jet recording method according to the embodiment.

FIG. 5 is a perspective view illustrating an example of a configuration in the surroundings of the carriage of the recording apparatus illustrated in FIG. 1. A configuration 100a in the surroundings of the carriage has the carriage 2, the ink jet head 3 that is mounted on the carriage 2, a member 3a that is a part of the ink jet head 3 and includes nozzles for ejecting the ink, an ink accommodation body (not illustrated), and an ink supply path (not illustrated) that supplies the ink from the ink accommodation body to the ink jet head 3, such as an ink supply tube. The ink accommodation body may be provided at a location other than the carriage 2 or may be provided at the carriage. Also, the configuration 100a includes the platen 4, which is arranged below the carriage 2, to which the recording medium 1 is transported, a carriage moving mechanism 2a that relatively moves the carriage 2 relative to the recording medium 1, a medium feeding mechanism 20a that transports the recording medium 1 in a medium feeding direction, and a control unit CONT that controls operations of the carriage 2 and the like. The direction S1-S2 corresponds to the main scanning direction while the direction T1→T2 corresponds to the sub scanning direction. Note that main scanning is performed on any one side of the main scanning direction (the left-right direction of the apparatus) in the main scanning performed one time.

Figure 2:
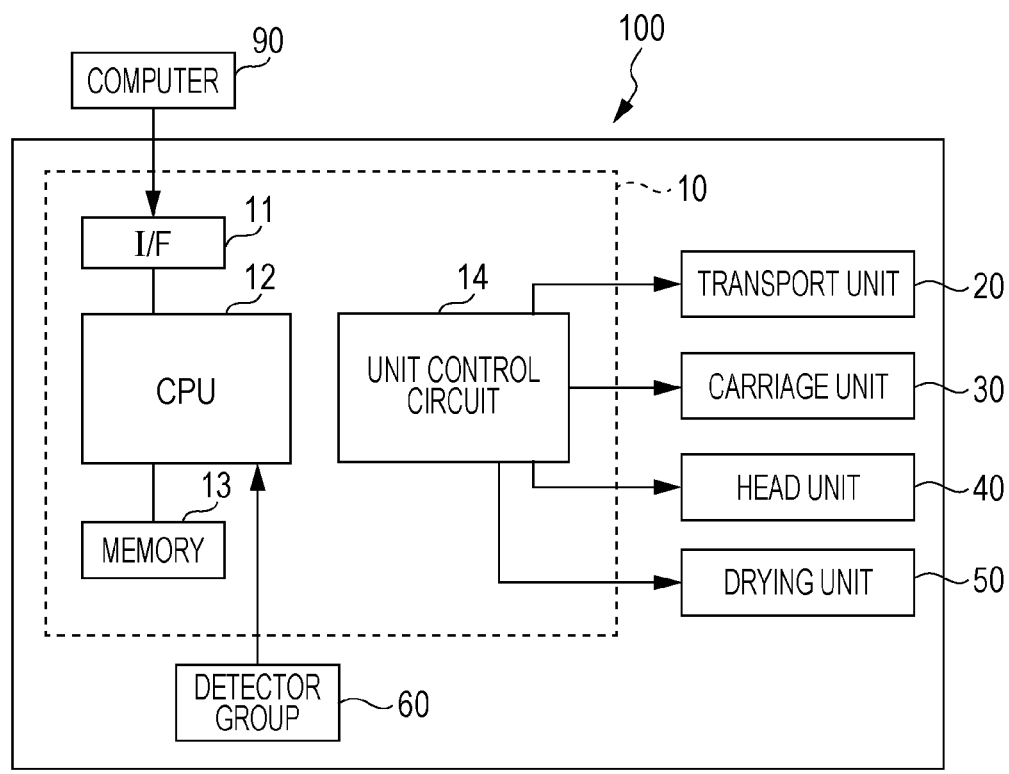
FIG. 2 is a block diagram of the ink jet apparatus that is used in the ink jet recording method according to the embodiment.

FIG. 2 is a functional block diagram of the ink jet recording apparatus 100. The controller 10 is a control unit that performs control of the ink jet recording apparatus 100. An interface unit 11 (I/F) is for transmitting and receiving data between the computer 90 and the ink jet recording apparatus 100. A CPU 12 is an arithmetic processing device for performing overall control of the ink jet recording apparatus 100. A memory 13 is for securing a region in which a program of the CPU 12 is stored, a working region, and the like. The CPU 12 controls the respective units using a unit control circuit 14. Note that a detector group 60 monitors conditions in the ink jet recording apparatus and the controller 10 controls the respective units on the basis of the detection results.

A transport unit 20 is for controlling sub scanning (transport) of ink jet recording, and specifically, the transport unit 20 controls a transport direction and a transport speed of the recording medium 1. Specifically, the transport direction and the transport speed of the recording medium 1 are controlled by controlling a rotation direction and a rotation speed of a transport roller that is driven by a motor.

A carriage unit 30 is for controlling the main scanning (pass) of ink jet recording, and specifically, the carriage unit 30 is for reciprocating the ink jet head 3 in the main scanning direction. The carriage unit 30 includes the carriage 2 on which the ink jet head 3 is mounted and a carriage moving mechanism for reciprocating the carriage.

The head unit 40 is for controlling the amount of the processing solution or the ink composition ejected from the nozzles of the ink jet head. In a case in which the nozzles of the ink jet head are designed to be driven by piezoelectric elements, for example, operations of the piezoelectric elements in the respective nozzles are controlled. The head unit 40 controls the dot sizes of the processing solution in a time from adhesion of the processing solution to adhesion of the ink. The amount of the processing solution adhering per scanning is controlled depending on a combination of control of the carriage unit 30 and the head unit 40.

A drying unit 50 controls temperatures of various heaters such as the IR heater, the pre-heater, the platen heater, and the post-heater.

The aforementioned ink jet recording apparatus 100 alternately repeats an operation of causing the carriage 2 with the ink jet head 3 mounted thereon to move in the main scanning direction and a transport operation (sub scanning). At this time, the controller 10 controls the carriage unit 30 when each pass is performed, moves the ink jet head 3 in the main scanning direction, controls the head unit 40, causes predetermined nozzle holes of the ink jet head 3 to eject liquid droplets of the processing solution or the ink compositions, and causes the liquid droplets of the ink compositions to adhere to the recording medium 1. The controller 10 controls the transport unit 50 and causes the transport unit 50 to transport the recording medium 1 in the transport direction by a predetermined transport amount during the transport operation.

A recording region to which a plurality of liquid droplets (dots) have been caused to adhere is gradually transported by the pass and the transport operations being repeated.

Then, the liquid droplets that have been caused to adhere to the recording medium are dried by the post-heater 5, thereby completing an image. Thereafter, the completed recorded product may be wound into a roll shape using a winding mechanism (not illustrated) or may be transported by a flatbed mechanism (not illustrated).

FIGS. 3A to 3D illustrate four examples of a head configuration of the ink jet head 3 that is mounted on the carriage. As illustrated in FIGS. 3A to 3D, the ink jet head 3 includes an ejection region R that includes nozzle arrays for ejecting the processing solution, a plurality of ejection regions C1 to C4 that include a plurality of nozzle arrays for ejecting the colored ink composition, and an ejection region CL that includes nozzle arrays for ejecting the clear ink composition. Note that in the ink jet head 3, the ejection region R for ejecting the processing solution may not necessarily be provided and may not necessarily be provided at the location illustrated in the drawings. The ejection regions C1 to C4 are configured to respectively eject different colored ink compositions. In FIGS. 3A to 3D, the hatched portions in the ejection regions are not used for recording. In FIGS. 3A to 3D, D1 represents the main scanning direction (the moving direction of the carriage), and D2 represents the sub scanning direction (the transport direction of the recording medium).

The ejection regions are continuing regions that include the upper end nozzle to the lower end nozzle in the drawing in the sub scanning direction in the regions. Note that the ejection regions use nozzles that belong to the regions for recording in the recording method. Whether or not the nozzles that belong to the regions actually eject the ink depends on the image to be recorded, and the ink is ejected if there is an image to be recorded. In a case in which a fully solid image with high concentration is to be recorded in an entire range with a band shape that faces the ejection regions when the ejection regions move in the main scanning direction, the nozzles are supposed to eject the ink, and the regions including the nozzles correspond to the ejection regions.

Although the nozzles are represented by dots in FIGS. 3A to 3D, density of the dots in the sub scanning direction may be higher in practice, and the drawings are just conceptual drawings. The ejection regions C1 to C4 are not limited to the configuration of capable of ejecting the four colored ink composition as in the drawings, and any configuration may be employed as long as the ejection regions C1 to C4 can eject one or more colored ink compositions.

Figure 3:
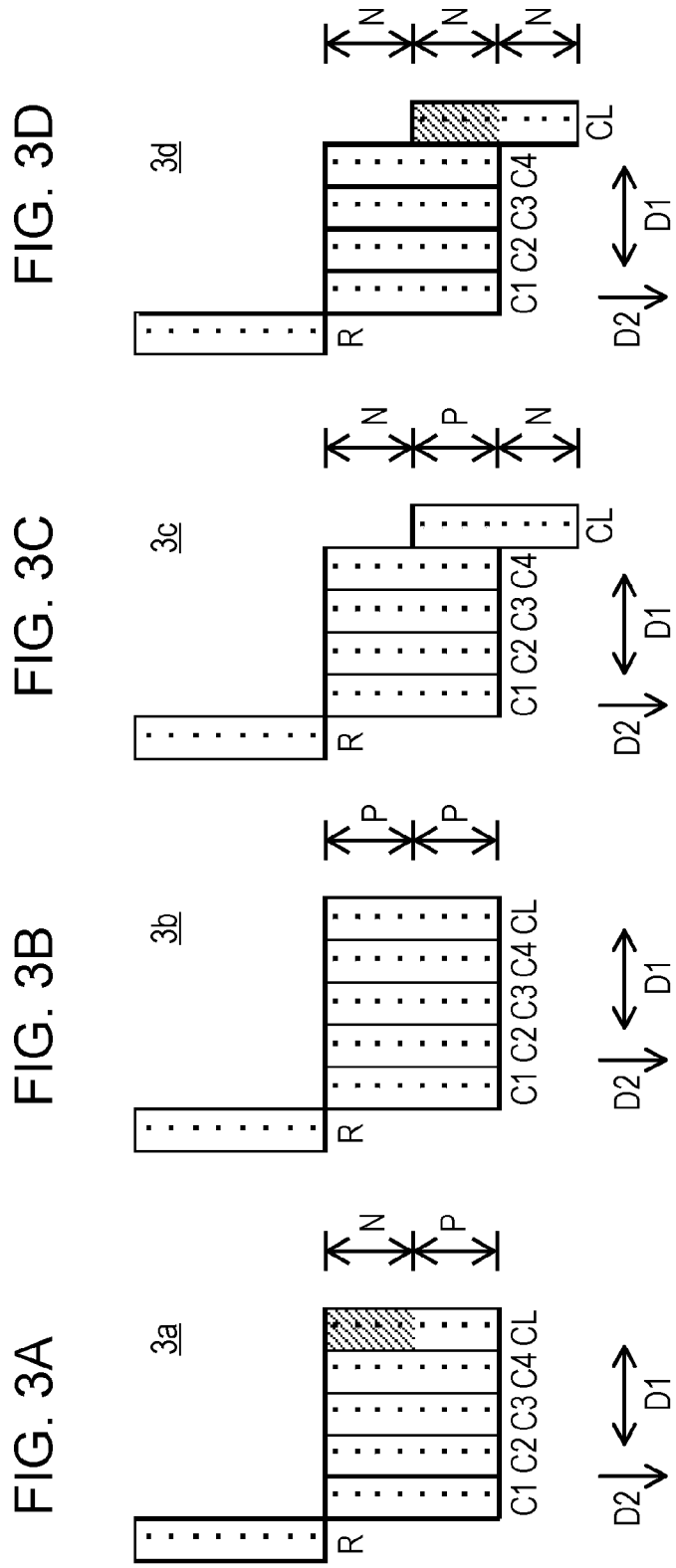
FIGS. 3A to 3D are diagrams illustrating examples of a configuration of an ink jet head that is used in the ink jet recording method according to the embodiment.

The head configuration 3a illustrated in FIG. 3A has a region P where the ejection regions C1 to C4 in which the colored ink composition is ejected from the ink jet head in main scanning (also referred to as pass) and the ejection region CL in which the clear ink composition is ejected from the ink jet head in the main scanning overlap with one another in a sub scanning direction D2. Note that in sub scanning, the recording medium 1 is transported by the length of the region P in the sub scanning direction D2 in sub scanning performed one time. However, the transport length in the sub scanning performed one time is not limited thereto and may be shorter, and the number of times of the main scanning (which will be described later) increases as the transport length is shorter. Also, the transport length may be longer if possible, and the number of times of the main scanning decreases as the transport length is longer. The same is true for the following example. In the example of the head configuration 3a, it is possible to eject the clear ink composition to the corresponding location in main scanning performed later in a case in which the number of times of main scanning of the colored ink is a plural number.

The head configuration 3a is configured such that the second halves (downstream portions) of the colored ink ejection regions C1 to C4 overlap with the ejection region CL in which the clear ink composition is ejected. That is, a region P where the ejection regions C1 to C4 in which the colored ink composition is ejected from the ink jet head in main scanning and the ejection region CL in which the clear ink composition is ejected from the ink jet head in the main scanning overlap with each other in the sub scanning direction D2 is provided, and a region N where the ejection region CL in which the clear ink composition is ejected from the ink jet head in the main scanning does not overlap with the ejection regions C1 to C4 in which the colored ink composition is ejected from the ink jet head in the main scanning in the sub scanning direction D2 is provided. The head configuration 3a has an overlapping region P on the downstream side of the non-overlapping region N in the sub scanning direction.

The head configuration 3b illustrated in FIG. 3B is configured such that the ejection regions C1 to C4 in which the colored ink composition is ejected from the ink jet head in main scanning and the ejection region CL in which the clear ink composition is ejected from the ink jet head in the main scanning completely overlap with each other in the sub scanning direction D2. Note that in the sub scanning, the recording medium 1 is transported by the length of the region P in the sub scanning direction D2. Since the region in which the clear ink composition is ejected in the overlapping region P is longer in the head configuration 3b than in the head configuration 3a, it is possible to increase the amount of ejected clear ink and to increase the number of times of main scanning in which the clear ink composition is ejected.

The head configuration 3c illustrated in FIG. 3C is configured such that the second halves (downstream portions) of the colored ink ejection regions C1 to C4 overlap with the ejection region CL in which the clear ink composition is ejected similarly to the head configuration 3a. The head configuration 3a is different from the head configuration 3a in that the clear ink ejection region CL extends in the sub scanning direction such that the region N that does not overlap with the colored ink ejection regions C1 to C4 is provided. Although it is possible to eject the clear ink composition in main scanning that is performed later in the main scanning performed a plurality of times to eject the colored ink composition, to further increase the amount of ejected clear ink, and to increase the number of times of the main scanning to eject the clear ink composition in the head configuration 3c, the entire length of the head configuration in the sub scanning direction increases.

The head configuration 3d (comparative example) illustrated in FIG. 3D is configured such that the ejection regions C1 to C4 in which the colored ink composition is ejected from the ink jet head in main scanning and the ejection region CL in which the clear ink composition is ejected from the ink jet head in the main scanning do not overlap in the sub scanning direction D2.

The aforementioned four head configurations are just examples, and various modifications can be made. In the head configuration 3a or 3c, a ratio between the overlapping region P and the non-overlapping region N in which the colored ink is ejected and the clear ink is not ejected relative to the length of the colored ink ejection regions in the sub scanning direction is not limited to half-and-half, and the ratio of the overlapping region may be increased or decreased. In the head configuration 3c, a ratio of the length of the overlapping region P relative to the length of the ejection region CL in the sub scanning direction is not limited to the half length and may be longer or shorter. A ratio of the length of the overlapping region P relative to the length of the ejection region of the colored ink composition in the sub scanning direction is preferably equal to or less than 0.7, is more preferably equal to or less than 0.5, and is further preferably equal to or less than 0.3 in terms of image quality. Meanwhile, the ratio is preferably equal to or greater than 0.3, is more preferably equal to or greater than 0.5, and is further preferably equal to or less than 0.7 in terms of reduction of deviations in glossiness.

In the head configuration 3a or 3d, the region (hatched region) in which the clear ink composition is not ejected may be a region, which is not used for recording although a head (nozzles) is arranged, in which the clear ink composition is not ejected, or may be a region in which no head (nozzles) is arranged and the clear ink composition is not ejected. The same is true for the ejection region that is used for recording, the ejection region means the ejection region that is used in the recording method, and a region that is not used for recording although the head itself is arranged therein is not included in the ejection region. The colored ink composition ejection region and the non-ejection region are also similar to those of the clear ink composition.

In the embodiment, the head configurations 3a to 3c are used, the head configuration 3a or 3b is preferably used, and the head configuration 3a is further preferably used from among the head configurations 3a to 3d illustrated in FIGS. 3A to 3D.

Recording Medium

In the embodiment, a non-absorbable or low-absorbable recording medium is used as the recording medium 1. Filing properties due to repelling of the water-based ink composition further tends to be degraded as the non-absorbable recording medium or the low-absorbable recording medium is further low-absorbable or non-absorbable. Thus, it is advantageous to use the ink jet recording method according to the embodiment for such a recording medium. The non-absorbable recording medium or the low-absorbable recording medium are useful since the recording medium itself has water resistance and durability and recorded products can be utilized for various purposes. Meanwhile, some recording medium has a surface with glossiness, and a difference in glossiness between a recorded portion and non-recorded portion tends to appear significantly in a case in which glossiness at a portion, to which the ink compositions have to be caused to adhere, is low. Also, differences in glossiness depending on locations in the portion to which the ink compositions have to be caused to adhere, tend to appear significantly.

Here, the "low-absorbable recording medium" or the "non-absorbable recording medium" means a recording medium with a water absorption amount of equal to or less than 10 mL/m2 in 30 msec from a start of contact in the Bristow method. The Bristow method is a method that has been most widely distributed as a method of measuring a liquid absorption amount in a short time and has also been employed by JAPAN TAPPI. Details of the test method are described in Standard No. 51 "Paper and plate paper-liquid absorbability test method-Bristow method" in "JAPAN TAPPI paper pulp test method 2000".

Also, the non-absorbable recording medium or the low-absorbable recording medium can also be classified depending on wettability of the recording surface with respect to water. For example, the recording medium can be characterized by dropping 0.5 µL of water droplets on a recording surface of the recording medium and measuring a contact angle decrease rate (comparison between a contact angle at 0.5 milliseconds after landing and a contact angle at 5 seconds). More specifically, as characteristics of the recording medium, non-absorbability of the "non-absorbable recording medium indicates that the aforementioned decrease rate is less than 1% while the low-absorbability of the "low-absorbable recording medium" indicates that the aforementioned decrease rate is equal to or greater than 1% and less than 5%. In addition, the absorbability indicates that the aforementioned decrease rate is equal to or greater than 5%. Note that the contact angles can be measured using a portable contact angle meter PCA-1 (manufactured by Kyowa Interface Science).

Although the low-absorbable recording medium is not particularly limited, examples thereof include coated paper with a coated layer for receiving oil-based ink provided on the surface thereof. Although the coated paper is not particularly limited, examples thereof include recording sheets such as art paper, coating applied paper, matte paper.

Although the non-absorbable recording medium is not particularly limited, examples thereof include a plastic film that does not have an ink absorption layer, a recording medium obtained by coating a base material such as paper with plastic, and a recording medium with a plastic film bonded thereto. Examples of the plastic described herein include polyvinyl chloride, polyethylene terephthalate, polycarbonate, polystyrene, polyurethane, polyethylene, and polypropylene.

Further, it is also possible to use an ink non-absorbable or low-absorbable recording medium such as a plate made of metal such as iron, silver, copper, or aluminum or glass in addition to the aforementioned recording medium.

The width of the recording medium in the main scanning direction is preferably equal to or greater than 50 cm, is more preferably from 80 to 400 cm, is further preferably from 100 to 350 cm, and is particularly preferably from 130 to 300 cm. In a case in which the width of the recording medium in the main scanning direction falls within the aforementioned range, it is possible to perform recording of a recorded product that is useful for display or the like. Meanwhile, although deviations in glossiness tend to occur, the recording medium with the width within the aforementioned range is preferably used since it becomes possible to reduce differences in glossiness according to the embodiment.

Ink Jet Recording Method

The ink jet recording method according to the embodiment includes an ink adhesion process of ejecting the ink compositions containing the colored ink composition that contains the coloring material and the clear ink composition that contains resin from the ink jet head that is mounted on the carriage and causes the ink compositions to adhere to the low-absorbable or non-absorbable recording medium and a processing solution adhesion process of causing the processing solution that contains the aggregating agent for aggregating constituents in the colored ink composition to adhere to the recording medium. The ink adhesion process is performed by main scanning in which the ink compositions are ejected while the relative positions of the ink jet head and the recording medium are changed in the main scanning direction and the sub scanning in which the relative positions of the carriage and the recording medium are changed in the sub scanning direction that intersects the main scanning direction. Then, main scanning that involves a region where the recording region in which the colored ink composition is ejected from the ink jet head in main scanning and the recording region in which the clear ink composition is ejected from the ink jet head in the main scanning overlap with one another. Hereinafter, the recording method will be described in order.

Processing Solution Adhesion Process

The processing solution adhesion process is a process in which the processing solution that contains the aggregating agent for aggregating the ink compositions is caused to adhere to the recording medium. The aggregating agent has a function of reacting a pigment that contains the ink compositions, pigment dispersion resin that can be contained in the ink compositions, and the like and aggregate the pigment. In this manner, it is possible to suppress occurrence of bleeding or the like of an image recorded using the ink composition and to obtain an image with excellent image quality.

In the embodiment, the processing solution is preferably caused to adhere to the recording region to which the colored ink composition has to be adhere in the main scanning for ejecting the colored ink composition and causing the colored ink composition to adhere thereto before the main scanning or in the main scanning, and the former is more preferably employed. In a case in which the processing solution is caused to adhere before the main scanning, the adhesion of the processing solution is performed by using a reaction solution ejection region R provided in the ink jet head 3 illustrated in FIGS. 3A to 3D or by using another mechanism such as roller application without using the ink jet head. Note that the timing of the adhesion of the processing solution is not limited to the aforementioned mode.

Number of Times of Main Scanning

The number of times of the main scanning is also referred to as the number of passes. The number of times of the recording region in which a certain ink composition is caused to adhere in main scanning overlaps with a certain location in the recording region in which recording is performed by the recording method in the sub scanning direction is referred to as the number of times of the main scanning of the ink composition. The number of passes is calculated for each ink type. In the example illustrated in FIG. 3A, for example, the number of times of main scanning is two for the colored ink composition that is ejected from the ejection region C1, and the number of times of the main scanning is one for the clear ink composition that is ejected from the ejection region CL. A larger number of times of main scanning is more preferable since it is possible to increase the total amount of adhering ink composition that is caused to adhere to the recording region and it is possible to cause the ink to adhere to the recording region through a plurality of times of main scanning. Meanwhile, a smaller number of times of main scanning is preferable in terms of a high recording speed. It is possible to increase the number of times of main scanning by reducing the distance of sub scanning performed one time and to reduce the number of times of main scanning by increasing the distance.

Ink Composition Adhesion Process

The ink composition adhesion process is a process of ejecting the ink composition (ink set) that contains the colored ink composition containing the coloring material and the clear ink composition containing the resin from the ink jet head that is mounted on the carriage and causing the ink composition to adhere to the low-absorbable or non-absorbable recording medium 1.

In the embodiment, the ink adhesion processing is performed by main scanning in which the ink composition is ejected while the relative positions of the ink jet head 3 and the recording medium 1 are changed in the main scanning direction and the sub scanning in which the relative positions of the carriage 2 and the recording medium 1 are changed in the sub scanning direction that intersects the main scanning direction, and main scanning that involves a region where the recording region in which the colored ink composition is ejected from the ink jet head in main scanning and the recording region in which the clear ink composition is ejected from the ink jet head in the main scanning overlap with one another is performed (see FIGS. 3A to 3C).

Performing the main scanning that involves the region where the recording region in which the colored ink composition is ejected from the ink jet head in main scanning and the recording region in which the clear ink composition is ejected from the ink jet head in the main scanning overlap with one another is also referred to as causing of the colored ink composition and the clear ink composition to adhere to the recording medium at the same time. This means that there is a region where the recording region in which the colored ink composition is ejected and the recording region in which the clear ink composition is ejected overlap with one another in the same main scanning.

Note that the overlapping region in the main scanning as described above is a recording region in which the ink is ejected on the assumption that all images to be recorded are present in a region to which the ejection region of the ink jet head has been moved in the main scanning direction in the main scanning as will be described later. Therefore, the recording region has a band shape that has a length of the ejection region of the ink jet head in the sub scanning direction and extends in the main scanning direction. Accordingly, having the region where the aforementioned recording regions overlap with one another can also be stated as having an overlapping region in the sub scanning direction. Having an overlapping region in the sub scanning direction means that there are regions, the positions of which coincide with one another in the sub scanning direction.

In the embodiment, having a region where the recording region in which the colored ink composition is ejected from the ink jet head in main scanning and the recording region in which the clear ink composition is ejected from the ink jet head in the main scanning overlap with one another is also referred to as having a region where the recording region in which the colored ink composition is ejected from the ink jet head in the main scanning and the recording region in which the clear ink composition is ejected from the ink jet head in the main scanning overlap with one another in the sub scanning direction.

The aforementioned ink composition adhesion process make it possible to achieve excellent reduction of deviations in glossiness through the recording method. The reason is estimated to be because differences in glossiness in the adhesion region of the respective passes since copresence of the clear ink composition alleviates the aggregation speed of the constituents of the colored ink composition when the colored ink composition adheres to the recording medium and is brought into the processing solution and the constituents of the ink aggregates. However, the reason is not limited thereto.

In a case in which the head configuration illustrated in FIG. 3A is used, a layer of the processing solution is formed on the surface of the recording medium 1, a layer of the colored ink composition is formed on the layer of the processing solution, and layers of the colored ink composition and the clear ink composition are formed on the layer of the colored ink composition.

In the case in which the head configuration 3a illustrated in FIG. 3A is used, the number of times of main scanning for the clear ink composition is smaller than that for the colored ink composition.

Figure 4:
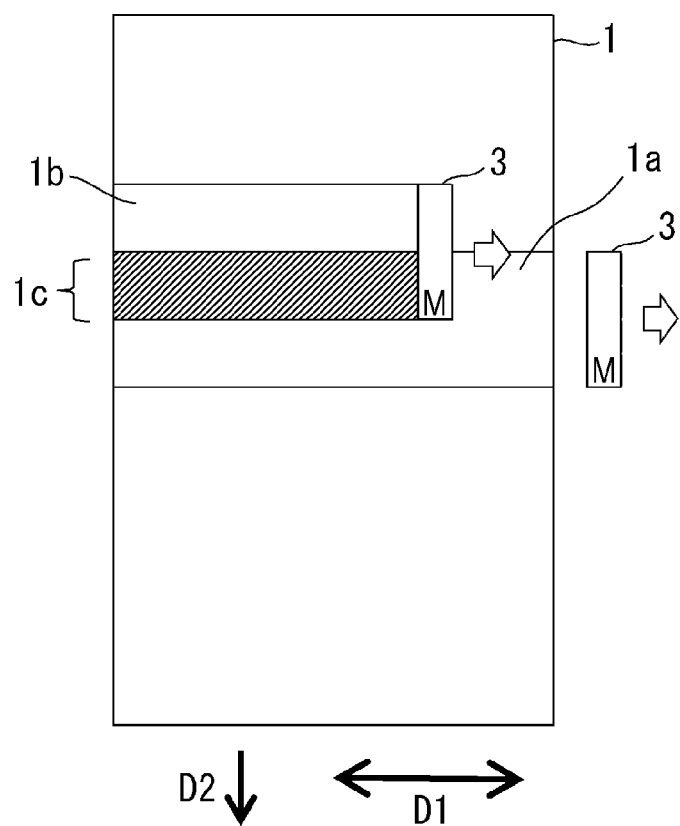
FIG. 4 is an image diagram of an example of formation of a recording region in the ink jet recording method according to the embodiment.

FIG. 4 is an image diagram in a case in which the ink composition is caused to adhere in main scanning using the ejection region C1 in the head configuration 3a illustrated in FIG. 3A to form a recording region. The ink composition is ejected while the relative positions of an ejection region M of the ink jet head 3 and the recording medium 1 are changed in the main scanning direction D1 with the movement of the carriage, which is not illustrated in the drawing, and a recording region 1a is thus formed. Next, the recording medium 1 is moved (sub scanning) by a predetermined amount in the sub scanning direction D2. Then, the ink composition is ejected while the relative positions of the ink jet head 3 and the recording medium 1 are changed in the main scanning direction D1 with the movement of the carriage, which is not illustrated in the drawing, to perform next main scanning, and a recording region 1b is thus formed. FIG. 4 illustrates a course through which the recording region 1b is formed. Note that main scanning and the next main scanning are performed independently on any one of left and right sides in the main scanning direction in the drawing and may be performed on the right side or the left side in the drawing. Here, a region 1c where the first recording region 1a and the second recording region 1b overlap with one another is present. The overlapping region 1c corresponds to a region with a half length of the ejection region C1 in FIG. 3A. Note that the overlapping region 1c also corresponds to a region with a length corresponding to the clear ink composition ejection region CL.

The recording region in which the ink is ejected in main scanning is a recording region, on which the ejection region of the ink jet head performs main scanning in the main scanning direction in the main scanning, which aces the ejection region. Whether or not to actually cause the ink to be ejected and adhere to the recording region in the main scanning depends on whether or not there is an image to be recorded in the recording region, and the ink is ejected and caused to adhere if there is an image to be recorded in the recording region. In a case in which a fully solid image with high concentration is to be recorded over the entire recording region, the region is a region to which the ink is ejected from the ejection region and is caused to adhere in the main scanning, and this is referred to as a recording region to which the ink is ejected in the main scanning.

FIGS. 6A to 6D are image diagrams illustrating four examples in a case in which a recording region is formed in main scanning in which the ejection regions of the ink jet heads illustrated in FIGS. 3A to 3D are used to eject the colored ink composition and the clear ink composition and cause the colored ink composition and the clear ink composition to adhere. In FIGS. 6A to 6D, one colored ink composition is used, and the ejection region C is used. The ink composition is ejected while the relative positions of the ejection regions (C and CL) of the ink jet head and the recording medium 1 are changed in the main scanning direction D1 with movement of the carriage in the main scanning direction D1, which is not illustrated in the drawing. The example in FIGS. 6A to 6D illustrate a course through which a recording region is formed through certain main scanning. After the main scanning, sub scanning in which the recording medium is transported in the sub scanning direction D2 is performed with the ejection region. After the sub scanning, the next main scanning is performed at a location of the recording medium on the upstream side (on the upper side in the drawing) in the sub scanning direction beyond the location of the recording medium in FIGS. 6A to 6D, and a recording region is formed through the main scanning. Recording is performed by repeating the main scanning and the sub scanning in this manner. The distance of the sub scanning performed one time is the length of the colored ink ejection region in the example of the head configurations in FIGS. 3A to 3D and corresponds to the length of 6c in FIG. 6A, the distance is not limited to these examples, the distance in the sub scanning direction may be longer or shorter, the number of times of main scanning increases as the distance increases, and the number of times of main scanning decreases as the distance decreases.

In the example in FIG. 6A, a recording region 6a of the clear ink composition is formed on the recording medium by the ejection region CL in certain main scanning, and a recording region 6b of the colored ink composition is formed on the recording medium by the ejection region C in the main scanning. At this time, a recording region 6c in which the recording region 6a and the recording region 6b overlap with one another in the sub scanning direction is formed in the main scanning. Also, a region (non-overlapping region) in which the colored ink is ejected while the clear ink is not ejected is formed on the upstream side in the sub scanning direction of the region 6c overlapping in the main scanning.

In the example in FIG. 6B, the recording region 6a of the clear ink composition is formed on the recording medium by the ejection region CL in certain main scanning, and the recording region 6b of the colored ink composition is formed on the recording medium by the ejection region C in the main scanning. At this time, the recording region 6c in which the recording region 6a and the recording region 6b overlap with one another in the sub scanning direction is formed in the main scanning. The entire recording region 6b of the colored ink composition is the overlapping region, and no non-overlapping region is formed.

In the example in FIG. 6C, the recording region 6a of the clear ink composition is formed on the recording medium by the ejection region CL in certain main scanning, and the recording region 6b of the colored ink composition is formed on the recording medium by the ejection region C in the main scanning. At this time, the recording region 6c in which the recording region 6a and the recording region 6b overlap with one another in the sub scanning direction is formed in the main scanning. A region (non-overlapping region) in which the colored ink is ejected and the clear ink is not ejected is formed on the upstream side in the sub scanning direction of the overlapping region 6c in the main scanning. Also, a region (non-overlapping region) in which the colored ink is not ejected and the clear ink is ejected is formed on the downstream side in the sub scanning direction of the overlapping region 6c in the main scanning.

In the example in FIG. 6D, the recording region 6a of the clear ink composition is formed on the recording medium by the ejection region CL in certain main scanning, and the recording region 6b of the colored ink composition is formed on the recording medium by the ejection region C in the main scanning. At this time, a recording region in which the recording region 6a and the recording region 6b overlap with one another in the sub scanning direction is not formed in the main scanning.

The aforementioned four recording regions are just examples, and various modifications can be made. In FIGS. 6A and 6C, a ratio between the overlapping region 6c and the non-overlapping region in which the colored ink is ejected and the clear ink is not ejected is not limited to half-and-half relative to the length of the recording region 6b of the colored ink composition in the sub scanning direction, and the ratio of the overlapping region 6c may be larger or smaller. The length of the overlapping region 6c in the sub scanning direction in FIG. 6C is not limited to the half length of the clear ink recording region 6a and may be longer or shorter. In FIG. 6C, a region in which the colored ink is ejected and the clear ink is not ejected may not be formed on the upstream side in the sub scanning direction of the overlapping region 6c.

A ratio of the length of the overlapping region relative to the length of the recording region of the colored ink composition in the sub scanning direction is preferably equal to or less than 0.7, is more preferably equal to or less than 0.5, and is further preferably equal to or less than 0.3 in terms of image quality. Meanwhile, the ratio is preferably equal to or greater than 0.3, is more preferably equal to or greater than 0.5, and is further preferably equal to or greater than 0.7 in terms of reduction of deviations in glossiness.

The ratio of the length of the recording region in the sub scanning direction can be replaced with a ratio of the number of times of main scanning for performing recording in the recording region. The number of times of main scanning of the recording region in which the colored ink and the clear ink are caused to adhere at the same time is preferably equal to or less than two third and is more preferably equal to or less than one second of the number of times of main scanning of the recording region of the colored ink in terms of more excellent image quality and abrasion resistance. Meanwhile, number of times of main scanning of the recording region in which the colored ink and the clear ink are caused to adhere at the same time is preferably equal to or greater than one third and is more preferably equal to or greater than one second in terms of more excellent reduction of deviations in glossiness.

In the ink composition adhesion process, it is preferable that the recording medium 1 be heated by using the platen heater 4a and that the ink adhesion process is performed on the heated recording medium 1. In this manner, the effect of improving deviations in glossiness by causing the colored ink composition and the clear ink composition to be ejected at the same time can be achieved. The mechanism that heats the recording medium in the ink adhesion process is not limited to the platen heater, and the mechanism may be a blowing mechanism that feeds air with heat to the recording medium or a mechanism that irradiates the recording medium with radiation that generates heat.

In the ink composition adhesion process, the surface temperature of the recording medium is preferably equal to or less than 50° C., is more preferably equal to or less than 40° C., is further preferably equal to or less than 38° C., and is particularly preferably equal to or less than 35° C. Also, the surface temperature is preferably equal to or greater than 20° C., is more preferably equal to or greater than 25° C., is further preferably equal to or greater than 28° C., and is particularly equal to or greater than 32° C. The temperature is a surface temperature of a portion that receives adhesion of the ink in the recording surface of the recording medium and is an average temperature during recording in a case in which recording is performed for a long time. The surface temperature within the aforementioned range is preferable since more excellent reduction of variations in glossiness, image quality, abrasion resistance, reduction of clogging, and high glossiness can be achieved.

In the ink composition adhesion process, the recording region preferably has a region in which the amount of adhering colored ink composition is from 4 to 25 mg/cm$^2$. The recording region more preferably has a region in which the amount of adhesion is from 7 to 20 mg/cm$^2$, further preferably has a region in which the amount of adhesion is from 10 to 17 mg/cm$^2$, and particularly preferably has a region in which the amount of adhesion is from 9 to 15 mg/cm$^2$. The amount of adhesion within the aforementioned range is preferable since excellent abrasion resistance, image quality, reduction of deviations in glossiness, and high glossiness can be achieved. Also, the maximum amount of the colored ink composition adhering to the recording region within the aforementioned range is also preferable in terms of the aforementioned points.

Note that in the case in which the recording region in the recording method is referred, this means the entire recording region on which recording is performed by the recording method. Meanwhile, in the case in which the aforementioned recording region in the main scanning is referred, this means the recording region on which recording is performed in the main scanning.

The recording region in the recording medium to which the ink compositions have been adhered preferably has a region in which the amount (ratio) of adhering processing solution is from 5 to 20 parts by mass, is preferably from 7 to 17 parts by mass, and is more preferably from 10 to 15 parts by mass with respect to 100 parts by mass of the adhering colored ink composition. In this manner, it is possible to aggregate the constituents of the colored ink composition by the reaction solution and to improve image quality in the recording region. Further, the maximum value of the aforementioned amount (ratio) of adhering processing solution in the recording region within the aforementioned range is also preferable in terms of the aforementioned points.

The recording region in the recording medium to which the ink compositions have been adhered preferably has a region in which the amount (ratio) of the adhering clear ink composition is from 10 to 60 parts by mass, is preferably from 15 to 50 parts by mass, and is more preferably from 20 to 40 parts by mass with respect to 100 parts by mass of adhering colored ink composition. In this manner, it is possible to reduce deviations in glossiness caused by the processing solution by using the clear ink composition. Further, the maximum value of the amount (ratio) of the aforementioned adhering clear ink composition in the recording region within the aforementioned range is also preferable in terms of the aforementioned points.

The ink composition adhesion process is performed by performing relative scanning (also referred to as main scanning or pass) between the ink jet head 2 and the recording medium 1 a plurality of times. More specifically, the ink composition adhesion process is performed by alternately repeating main scanning and sub scanning. The ink composition adhesion process is a serial-type recording method. In this manner, it is possible to perform recording on a recording medium with a wide lateral width without using a large head such as a line head. In contrast, there is also a case in which differences in glossiness occurs depending on locations in an image. In particular, this may be observed as glossiness banding. The reason is estimated to be because there are deviations in how aggregation of the colored ink composition of the ink using the processing solution proceeds depending on main scanning although this is just estimation.

In a case in which the number of times of main scanning is equal to or greater than two, it is possible to achieve excellent image quality since drying proceeds even during scanning of the colored ink compositions that have adhered to the recording medium y causing the colored ink composition necessary for the recording to adhere over a plurality of times of scanning. However, the differences in glossiness are to be solved.

Any number of times of main scanning of the colored ink composition may be employed as long as the number of times is equal to or greater than one, and the number is preferably equal to or greater than two, is more preferably from four to twenty, and is further preferably from eight to twelve.

Any number of times of main scanning of the clear ink composition may be employed as long as the number of times is equal to or greater than one, and the number of times is preferably equal to or greater than two, is preferably from two to eight, and is more preferably from four to six. The number of times of main scanning of the clear ink composition is preferably smaller than the number of times of main scanning of the colored ink composition.

Ink Composition Drying Process

The post-heater 5 deist the recording medium to which the ink compositions have adhered after the adhesion of the ink compositions. In this manner, the resin contained in the ink compositions on the recording medium is melted, and a recorded product with satisfactory filling properties can be formed. At that time, the heating temperature of the recording medium using the post heater 5 is preferably from 50 to 150° C., is more preferably equal to or greater than 70° C. and equal to or less than 120° C., and is further preferably equal to or greater than 80° C. and equal to or less than 110° C. The drying temperature within the aforementioned range tends to further improve abrasion resistance.

According to the ink jet recording method of the embodiment, it is possible to reduce deviations in glossiness by causing the colored ink composition and the clear ink composition to adhere at the same time in the ink jet recording method using the processing solution and the clear ink on a non-absorbable or low-absorbable recording medium.

EXAMPLES

Hereinafter, the invention will be more specifically described using embodiments and comparative examples. The invention is not limited to the following examples in any sense.

Preparation of Processing Solution and Ink Composition

The respective materials were mixed in compositions (% by mass) represented in Table 1 below and were sufficiently stirred, and various processing solutions, colored ink compositions, and clear ink compositions were prepared. The content of a pigment, resin, and a wax is solid content in ink or the like. A pigment dispersion was prepared by being stirred with pigment dispersant resin, which was not represented in the table, (styrene-acryl-based water-soluble resin) in water in advance at a mass ratio of the pigment:pigment dispersant resin=3:1 using bead milling. The average particle diameter increase rate of the pigment was ten times.

TABLE 1

| | Boiling point of solvent | Processing solution | | Colored ink | | | | Clear ink | | |
|---|---|---|---|---|---|---|---|---|---|---|
| | | Processing solution A | Processing Solution B | Colored ink A | Colored ink B | Colored ink C | Colored ink D | Clear ink A | Clear ink B | Clear ink C |
| Aggregating agent A | | 5 | 0 | 0 | 0 | 0 | 0 | 0 | 0 | 0 |
| Aggregating agent B | | 0 | 5 | 0 | 0 | 0 | 0 | 0 | 0 | 0 |
| Pigment | | 0 | 0 | 4 | 4 | 4 | 4 | 0 | 0 | 0 |
| Resin 1 | | 0 | 0 | 3 | 3 | 3 | 3 | 3 | 4 | 0 |
| Resin 2 | | 0 | 0 | 0 | 0 | 0 | 0 | 0 | 0 | 3 |
| Wax | | 0 | 0 | 1 | 1 | 1 | 1 | 2 | 1 | 2 |
| 2-pyrrolidone (nitrogen-containing solvent) | 245 | 25 | 25 | 20 | 20 | 10 | 0 | 25 | 25 | 25 |
| 3-methoxy-N,N-dimethylpropaneamide (nitrogen-containing solvent) | 215 | 0 | 0 | 0 | 0 | 0 | 20 | 0 | 0 | 0 |
| Glycerin | 290 | 0 | 0 | 0 | 5 | 0 | 0 | 0 | 0 | 0 |
| 1,3-butandiol | 203 | 3 | 3 | 5 | 5 | 5 | 5 | 5 | 5 | |
| Solvent | | 1 | 1 | 1 | 1 | 1 | 1 | 1 | 1 | 1 |
| Water | | Residual | Residual | Residual | Residual | Residual | Residual | Residual | Residual | Residual |
| Total | | 100 | 100 | 100 | 100 | 100 | 100 | 100 | 100 | 100 |
| Wax/resin ratio | | 0 | 0 | 0.33 | 0.33 | 0.33 | 0.33 | 0.67 | 0.25 | 0.67 |

The ink materials represented in Table 1 are as follows.
Aggregating agent A: polyvalent metal salt "magnesium sulfate heptahydrate"
Aggregating agent B: cationic polymer "Catiomaster PD-7" manufactured by Yokkaichi Chemical
Pigment: "PB15:3"
Resin: Styrene acrylic resin emulsion
Wax: Polyethylene-based "AQ515"
Surfactant: Silicon-based "BYK348"

The resin was obtained by adjusting the types and configuration ratios of acrylic monomers that form styrene-acrylic resin and performing polymerization. Average particle diameter increase rates of resin 1 and resin 2 were as follows.
Resin 1: average particle diameter increase rate of one time
Resin 2: average particle diameter increase rate of six times The aforementioned average particle diameter increase rate was obtained by measuring a change in the average particle diameters of resin using a particle size distribution measurement device when 0.3M aqueous magnesium sulfate solution and a resin solution obtained by dispersing or dissolving 1% by mass of resin in water were mixed at a mass ratio of 1:1 and were then stirred for one minute in an environment at 25° C. The average particle diameter was on the basis of a volume. As the particle size distribution measurement device, "Microtrac UPA" manufactured by Nikkiso was used.

As represented in Tables 2 to 4, recording was performed and various kinds of evaluation was conducted while various conditions of the ink jet recording method were changed. Hereinafter, details of the conditions of the recording method and the respective evaluation tests will be described.

TABLE 2

| | Example 1 | | | Example 2 | | | Example 3 | | | Example 4 | | | Example 5 | | |
|---|---|---|---|---|---|---|---|---|---|---|---|---|---|---|---|
| Ink | Processing solution A | Colored ink A | Clear ink A | Processing solution B | Colored ink A | Clear ink A | Processing solution A | Colored ink A | Clear ink A | Processing solution A | Colored ink A | Clear ink A | Processing solution A | Colored ink A | Clear ink A |
| Adhesion method | IJ | IJ | IJ | IJ | IJ | IJ | IJ | IJ | IJ | IJ | IJ | IJ | IJ | IJ | IJ |
| Number of times of main scanning | 8 | 8 | 4 | 8 | 8 | 4 | 8 | 8 | 4 | 8 | 8 | 4 | 8 | 8 | 4 |
| Clear ink adhesion scheme | | Method 1 | | | Method 1 | | | Method 1 | | | Method 1 | | | Method 1 | |
| Amount of adhesion (mg/inch$^2$) | 1.4 | 14 | 3 | 1.4 | 14 | 3 | 0.5 | 5 | 3 | 2.8 | 14 | 3 | 1.4 | 14 | 3 |
| Adhesion amount ratio (%) (processing solution/colored ink), (clear ink/colored ink) | 10 | — | 21 | 10 | — | 21 | 10 | — | 60 | 20 | — | 21 | 10 | — | 21 |
| Adhesion temperature (° C.) | | 30 | | | 30 | | | 30 | | | 30 | | | 40 | |
| Post-drying temperature (° C.) | | 100 | | | 100 | | | 100 | | | 100 | | | 100 | |
| Recording medium | | Recording medium 1 | | | Recording medium 1 | | | Recording medium 1 | | | Recording medium 1 | | | Recording medium 1 | |
| Glossiness deviations | | B | | | A | | | A | | | C | | | C | |
| Image quality | | A | | | B | | | A | | | A | | | A | |
| Abrasion resistance | | A | | | AA | | | B | | | B | | | A | |
| Clogging | | A | | | A | | | A | | | A | | | B | |
| Glossiness | | B | | | A | | | B | | | C | | | A | |

| | Example 6 | | | Example 7 | | | Example 8 | | | Example 9 | | |
|---|---|---|---|---|---|---|---|---|---|---|---|---|
| Ink | Processing solution A | Colored ink A | Clear ink B | Processing solution A | Colored ink A | Clear ink C | Processing solution A | Colored ink A | Clear ink A | Processing solution A | Colored ink A | Clear ink A |
| Adhesion method | IJ | IJ | IJ | IJ | IJ | IJ | IJ | IJ | IJ | IJ | IJ | IJ |
| Number of times of main scanning | 8 | 8 | 4 | 8 | 8 | 4 | 8 | 8 | 4 | 8 | 8 | 4 |
| Clear ink adhesion scheme | | Method 1 | | | Method 1 | | | Method 1 | | | Method 1 | |
| Amount of adhesion (mg/inch$^2$) | 1.4 | 14 | 3 | 1.4 | 14 | 3 | 1.4 | 14 | 6 | 1.4 | 5 | 3 |
| Adhesion amount ratio (%) (processing solution/colored ink), (clear ink/colored ink) | 10 | — | 21 | 10 | — | 21 | 10 | — | 43 | 28 | — | 60 |

TABLE 2-continued

|  |  |  |  |  |  |
|---|---|---|---|---|---|
| Adhesion temperature (° C.) |  | 30 | 30 | 30 | 30 |
| Post-drying temperature (° C.) |  | 100 | 100 | 100 | 100 |
| Recording medium |  | Recording medium 1 | Recording medium 1 | Recording medium 1 | Recording medium 1 |
| Glossiness deviations |  | B | C | A | C |
| Image quality |  | A | A | B | A |
| Abrasion resistance |  | B | C | A | C |
| Clogging |  | A | A | A | A |
| Glossiness |  | B | C | A | C |

TABLE 3-1

|  | Example 10 | | | Example 11 | | | Example 12 | | | Example 13 | | | Example 14 | | | Example 15 | | |
|---|---|---|---|---|---|---|---|---|---|---|---|---|---|---|---|---|---|---|
| Ink | Processing solution A | Colored ink B | Clear ink A | Processing solution A | Colored ink A | Clear ink A | Processing solution A | Colored ink A | Clear ink A | Processing solution A | Colored ink A | Clear ink A | Processing solution A | Colored ink A | Clear ink A | Processing solution A | Colored ink A | Clear ink A |
| Adhesion method | IJ | IJ | IJ | IJ | IJ | IJ | IJ | IJ | IJ | IJ | IJ | IJ | IJ | IJ | IJ | IJ | IJ | IJ |
| Number of times of main scanning | 8 | 8 | 4 | 8 | 8 | 8 | 8 | 8 | 8 | 8 | 8 | 8 | 8 | 8 | 4 | 8 | 8 | 4 |
| Clear ink adhesion scheme | Method 1 | | | Method 2 | | | Method 2 | | | Method 3 | | | Method 1 | | | Method 1 | | |
| Amount of adhesion (mg/inch²) | 1.4 | 14 | 3 | 1.4 | 14 | 3 | 1.4 | 14 | 6 | 1.4 | 14 | 3 | 2.1 | 14 | 3 | 1.4 | 14 | 3 |
| Adhesion amount ratio (%) (processing solution/colored ink), (clear ink/colored ink) | 10 | — | 21 | 10 | — | 21 | 10 | — | 43 | 10 | — | 21 | 15 | — | 21 | 10 | — | 21 |
| Adhesion temperature (° C.) | 30 | | | 30 | | | 30 | | | 30 | | | 30 | | | 30 | | |
| Post-drying temperature (° C.) | 100 | | | 100 | | | 100 | | | 100 | | | 100 | | | 100 | | |
| Recording medium | Recording medium 1 | | | Recording medium 1 | | | Recording medium 1 | | | Recording medium 1 | | | Recording medium 2 | | | Recording medium 2 | | |
| Glossiness deviations | A | | | A | | | A | | | A | | | A | | | A | | |
| Image quality | B | | | B | | | C | | | A | | | A | | | B | | |
| Abrasion resistance | C | | | C | | | B | | | A | | | B | | | B | | |
| Clogging | A | | | A | | | A | | | A | | | A | | | A | | |
| Glossiness | A | | | A | | | B | | | A | | | C | | | B | | |

TABLE 3-2

|  | Example 16 | | | Example 17 | | | Example 18 | | | Example 19 | | | Example 20 | | | Example 21 | | |
| --- | --- | --- | --- | --- | --- | --- | --- | --- | --- | --- | --- | --- | --- | --- | --- | --- | --- | --- |
| Ink | Processing solution A | Colored ink C | Clear ink A | Processing solution A | Colored ink D | Clear ink B | Processing solution A | Colored ink A | Clear ink A | Processing solution A | Colored ink A | Clear ink A | Processing solution A | Colored ink A | Clear ink A | Processing solution A | Colored ink A | Clear ink A |
| Adhesin method | IJ | IJ | IJ | IJ | IJ | IJ | IJ | IJ | IJ | IJ | IJ | IJ | IJ | IJ | IJ | IJ | IJ | IJ |
| Number of times of main scanning | 8 | 8 | 4 | 8 | 8 | 4 | 16 | 16 | 8 | 4 | 4 | 2 | 8 | 8 | 4 | 8 | 8 | 4 |
| Clear ink adhesion scheme | Method 1 | | | Method 1 | | | Method 1 | | | Method 6 | | | Method 1 | | | Method 1 | | |
| Amount of adhesion (mg/inch²) | 1.4 | 14 | 3 | 1.4 | 14 | 3 | 1.4 | 14 | 3 | 1.4 | 14 | 3 | 1.4 | 14 | 3 | 1.4 | 14 | 3 |
| Adhesion amount ratio (%) (processing solution/colored ink), (clear ink/colored ink) | 10 | — | 21 | 10 | — | 21 | 10 | — | 21 | 10 | — | 21 | 10 | — | 21 | 10 | — | 21 |
| Adhesion temperature (° C.) | 30 | | | 30 | | | 30 | | | 30 | | | 25 | | | 35 | | |
| Post-drying temperature (° C.) | 100 | | | 100 | | | 100 | | | 100 | | | 100 | | | 100 | | |
| Recording medium | Recording medium 1 | | | Recording medium 1 | | | Recording medium 1 | | | Recording medium 1 | | | Recording medium 1 | | | Recording medium 1 | | |
| Glossiness deviations | C | | | A | | | A | | | C | | | A | | | B | | |
| Image quality | B | | | B | | | A | | | B | | | C | | | A | | |
| Abrasion resistance | B | | | A | | | A | | | A | | | B | | | A | | |
| Clogging | A | | | A | | | A | | | A | | | A | | | A | | |
| Glossiness | B | | | A | | | B | | | B | | | B | | | A | | |

TABLE 4

|  | Comparative Example 1 | | | Comparative Example 2 | | | Comparative Example 3 | | | Comparative Example 4 | | | Comparative Example 5 | |
| --- | --- | --- | --- | --- | --- | --- | --- | --- | --- | --- | --- | --- | --- | --- |
| Ink | Processing solution A | Colored ink A | Clear ink A | Processing solution A | Colored ink A | Clear ink A | Processing solution A | Colored ink A | — | Colored ink A | Clear ink A | — | Colored ink A | — |
| Adhesin method | IJ | IJ | IJ | IJ | IJ | IJ | IJ | IJ | — | IJ | IJ | — | IJ | — |
| Number of times of main scanning | 8 | 8 | 4 | 8 | 8 | — | 8 | 8 | — | 8 | 4 | — | 8 | — |
| Clear ink adhesion scheme | Method 4 | | | Method 5 | | | — | | | Method 1 | | | — | |
| Amount of adhesion (mg/inch²) | 1.4 | 14 | 3 | 1.4 | 14 | 3 | 1.4 | 14 | — | — | 14 | 3 | — | 14 | — |

TABLE 4-continued

| | Comparative Example 1 | | | Comparative Example 2 | | | Comparative Example 3 | | | | Comparative Example 4 | | | Comparative Example 5 | |
|---|---|---|---|---|---|---|---|---|---|---|---|---|---|---|---|
| Ink | Processing solution A | Colored ink A | Clear ink A | Processing solution A | Colored ink A | Clear ink A | Processing solution A | Colored ink A | — | — | Colored ink A | Clear ink A | — | Colored ink A | — |
| Adhesion amount ratio (%) (processing solution/colored ink), (clear ink/colored ink) | 10 | — | 21 | 10 | — | 21 | 10 | — | — | — | — | 21 | — | — | — |
| Adhesion temperature (° C.) | | 30 | | | 30 | | | 30 | | | 30 | | | 30 | |
| Post-drying temperature (° C.) | | 100 | | | 100 | | | 100 | | | 100 | | | 100 | |
| Recording medium | | Recording medium 1 | | | Recording medium 1 | | | Recording medium 1 | | | Recording medium 1 | | | Recording medium 1 | |
| Glossiness deviations | | D | | | D | | | D | | | A | | | A | |
| Image quality | | A | | | A | | | A | | | D | | | D | |
| Abrasion resistance | | AA | | | AA | | | D | | | AA | | | D | |
| Clogging | | A | | | A | | | A | | | A | | | A | |
| Glossiness | | A | | | C | | | C | | | A | | | C | |

Recording Medium

As recording media, the following recording media were used.

Recording medium 1: Scotchcal Graphic Film IJ180-10 manufactured by 3M (vinyl chloride film; non-absorbable recording medium)

Recording medium 2: Elitelcast 73 manufactured by Daio Paper (coating applied paper; low-absorbable recording medium)

Clear Ink Adhesion Schemes

As clear ink adhesion schemes, the following methods 1 to 5 were used. The colored ink ejection region C1 and the clear ink ejection region CL illustrated in FIGS. 3A to 3D were used.

Method 1: The head configuration 3a illustrated in FIG. 3A was used. The distance of sub scanning was set to one eighth of the length of the ejection region C1 in the sub scanning direction in FIG. 3A. The number of passes for the clear ink composition was a half of that for the colored ink composition.

Method 2: The head configuration 3b illustrated in FIG. 3B was used. The distance of sub scanning was set to one eighth of the length of the ejection region C1 in the sub scanning direction in FIG. 3B. The number of passes for the clear ink composition was the same as that for the colored ink composition.

Method 3: The head configuration 3c illustrated in FIG. 3C was used. The distance of sub scanning was set to one eighth of the length of the ejection region C1 in the sub scanning direction in FIG. 3C. The number of passes for the clear ink composition was the same as that for the colored ink composition.

Method 4: The head configuration 3d illustrated in FIG. 3D was used. The distance of sub scanning was set to one eighth of the length of the ejection region C1 in the sub scanning direction in FIG. 3D. The number of passes for the clear ink composition is a half of that for the colored ink composition. This was a recording method that did not have a recording region in which the colored ink and the clear ink overlapped with one another in the same main scanning.

Method 5: Although the head configuration 3b illustrated in FIG. 3B was used, the ejection region CL in which the clear ink composition was ejected was not used. After the post-drying, discharge from the recording apparatus was performed, the clear ink composition was applied with a roller and was then subjected to the post-drying again using an oven under the same conditions as those for the post-drying. This was a recording method that did not have a recording region in which the colored ink and the clear ink overlapped with one another in the same main scanning.

Method 6: In Method 1, the distance of sub scanning was set to one fourth of the length of the ejection region C1 in the sub scanning direction in FIG. 3A, and the number of passes was set to a half of that in Method 1.

Recording Test

As the recording apparatus, a machine modified from SC-S80650 manufactured by EPSON was used. As described above, different head configurations were used for the clear recording methods 1 to 5. The C1 head was used for the ink while C2 to C4 were not used. The platen heater was adjusted such that the surface temperature of the recording medium became the adhesion temperature in the table at the time of the ink or the like was caused to adhere. In the example in which the adhesion temperature was 25° C., the platen heater was stopped, and no heating was performed. Drying was performed for about one minute at the post-drying temperature in the table with the post (post-drying) heater provided on the downstream side. Nozzle density of each nozzle array was set to 360 dpi. Recording resolution (number of recording units) of the ink was basically set to 1440×1440 dpi, one ink droplet was assumed to be 7 mg, and the dot density was adjusted to obtain the adhesion amount in the table. The recording pattern recorded on the recording medium was used for evaluation. The recording medium with a width worked to be 130 cm in the main scanning direction by cutting or attaching the recording medium was used.

The recording pattern formed on the recording medium after the recording was performed as described above was evaluated. Hereinafter, content of the respective evaluation tests will be described.

Deviations in Glossiness

A recording pattern with a size of 50 cm in the sub scanning direction with a width (126 cm) corresponding to a length of a remaining portion after leaving margins of 2 cm at both ends of the recording medium in the main scanning direction was recorded. The pattern at the recorded portion was reflected with light, and visual evaluation was performed.

It was observed that a portion with different glossiness was observed in the sub scanning direction of the recording pattern (glossiness banding). The observation was performed by causing a fluorescent light on the ceiling or the like to be reflected.

A: Glossiness banding was not recognized at a distance of 30 cm and a distance of 1 m from a recorded product.
B: Glossiness banding was not recognized at the distance of 1 m while the glossiness banding was slightly recognized at the distance of 30 cm.
C: Glossiness banding was not recognized at the distance of 1 m while the glossiness banding was considerably recognized at the distance of 30 cm.
D: Glossiness banding was recognized at the distance of 1 m.

Image Quality

The recording pattern that was same as that for the evaluation of deviations in glossiness was visually evaluated. It was confirmed whether or not there were deviations in colors in which ink colors were not uniform inside the pattern or there was ink bleeding in the surroundings of the pattern.

A: There were no deviations in colors inside and there was no bleeding.
B: There were no deviations in colors inside while there was bleeding in the surroundings.
C: Deviations in colors were slightly observed inside.
D: Deviations in colors were considerably observed inside.

Abrasion Resistance

The recording pattern that was the same as that for evaluating deviations in glossiness was evaluated using a JSPS-type rubbing tester for color fastness (device name "AB-301" manufactured by Tester Sangyo). Specifically, the recording region was rubbed over 120 round trips by applying a load of 490 g with a rubbing member with a white cotton cloth (in accordance with JIS L 0803) attached thereto.

AA: No contamination was observed, and no image peeling was observed.
A: Although contamination was observed in the white cotton cloth, no image peeling was observed.
B: Slight image peeling was observed (less than 20%).
C: Image peeling was observed (equal to or greater than 20% and less than 40%).
D: Image peeling was observed (equal to or greater than 40%).

Clogging

Recording was continuously performed four one hour by the recording test method. After the recording, an occurrence state of abnormal ejection (non-ejection or curving of flight) of 360 nozzles in the nozzle arrays for the colored ink was inspected.

A: No abnormal ejection was observed.
B: The rate of abnormal ejection nozzles was equal to or less than 2%.
C: The rate of abnormal ejection nozzles was greater than 3%.

Glossiness

Glossiness of the recording pattern was measured using a glossiness measurement device (GM-268 Plus manufactured by Konica Minolta). Measurement was also similarly conducted at locations, at which nothing was recorded, on the recording medium. A difference between both glossiness degrees was calculated.

(Measurement Condition: Glossiness Gs: Measurement Angle of $20°$)

A: The difference was equal to or less than five.
B: The difference was greater than five and equal to or less than fifteen.
C: The difference was greater than fifteen.

The findings described below were obtained from the results of the examples and the comparative examples.

In all the examples in which the processing solution, the colored ink, and the clear ink were used and the colored ink and the clear ink were caused to adhere at the same time, excellent image quality and excellent reduction of deviations in glossiness were achieved. Meanwhile, either the image quality or the reduction of deviations in glossiness was inferior in the comparative examples that were performed in different manners. Detailed description will be given below.

In comparison between Examples 1 and 3, more excellent abrasion resistance was achieved as the amount of adhering colored ink was larger, and more excellent reduction of deviations in glossiness was achieved as the amount was smaller.

In comparison between Examples 4 and 1 and comparison between Examples 9 and 3, more excellent reduction of deviations in glossiness was achieved, and further, more excellent abrasion resistance and higher glossiness were achieved, as the amount of adhering processing solution was smaller. The processing solution was essential to obtain excellent image quality, and it was discovered from this that the embodiment was useful in terms of reduction of deviations in glossiness in a case of obtaining excellent image quality using the processing solution.

In comparison between Examples 8 and 1, more excellent reduction of deviations in glossiness was achieved as the amount of adhering clear ink was larger, and more excellent image quality was achieved as the amount was smaller.

In comparison of Examples 18, 19, and 1, more excellent reduction of deviations in glossiness was achieved as the number of times of pass was larger.

In comparison of Examples 5, 20, 21, and 1, image quality tended to be more excellent as the heating temperature of the recording medium in the ink adhesion process was higher, while the reduction of the deviations in glossiness was slightly degraded and clogging resistance was also slightly degraded. It was discovered based on this that the embodiment was particularly useful in a case in which more excellent image quality was obtained by performing the heating process.

In comparison between Examples 11 and 1, although more excellent reduction of deviations in glossiness was achieved as larger amounts of colored ink and clear ink were caused to adhere at the same time, more excellent image quality and abrasion resistance were achieved when a mode in which the clear ink was not caused to adhere at the same time when the colored ink was caused to adhere was also included.

In comparison between Examples 12 and 11, abrasion resistance was lightly improved by increasing the amount of adhering clear ink, while the image quality was slightly degraded. It was discovered to be difficult to achieve more excellent properties merely by increasing the amount of adhering clear ink.

In comparison of Examples 13, 11, and 1, all the reduction of deviations in glossiness, image quality, abrasion resistance, and the like were particularly excellent by causing the clear ink to adhere at the same time in a part of the colored ink adhesion process and further causing the clear ink to adhere even after the adhesion of the colored ink. Meanwhile, the head that ejected the clear ink extended on the downstream side and the size of the apparatus tended to increase in Example 13.

In comparison between Examples 15 and ', more excellent reduction of deviations in glossiness was achieved while image quality was slightly degraded in a case in which the coating applied sheet was used as the recording medium. Further, it was discovered from Example 14 that the amount of adhering processing solution appropriate for the coating applied paper was larger than that for the recording medium 1 since more excellent image quality was achieved by increasing the amount of adhering the processing solution in a case in which the coating applied paper was used as the recording medium.

Further excellent reduction of deviations in glossiness was achieved in Example 2 than in Example 1 by using a cationic polymer as the aggregating agent of the processing solution.

In comparison between Examples 6 and 1, more excellent abrasion resistance was achieved in a case of using the clear ink that contained a larger amount of wax.

In comparison between Examples 7 and 1, more excellent reduction of deviations in glossiness and abrasion resistance were achieved in a case in which clear ink that contains resin with a small average particle diameter increase rate at the time of mixing an aqueous magnesium sulfate solution was used.

In comparison between Examples 10 and 1, more excellent image quality and abrasion resistance were achieved as the content of a high-boiling-point solvent in the colored ink was smaller.

In comparison between Examples 16 and 1, more excellent reduction of deviations in glossiness and image quality were achieved as the content of a nitrogen-containing solvent in the colored ink was larger.

In comparison between Examples 17 and 6, more excellent reduction of deviations in glossiness and abrasion resistance were achieved as the colored ink contained acyclic aide rather than cyclic amide as the nitrogen-containing solvent.

Meanwhile, the clear ink was not caused to adhere at the same time when the colored ink was caused to adhere, and reduction of deviations in glossiness became poor in Comparative Examples 1 and 2.

In Comparative Example 3 in which no clear ink was used, reduction of deviations in glossiness became poor.

In Comparative Example 4 in which no processing solution was used, image quality becomes poor.

In comparison 5 in which both the processing solution and the clear ink were not used, poor deviations of glossiness were not observed regardless of non-use of the clear ink although the image quality was poor. It was discovered on the basis of this that deviations of glossiness were to be solved in the case in which the processing solution was used.

Further, recording was performed on ordinary paper (PPC paper) that was an absorbable recording medium under the recording conditions in Comparative Example 1, and deviations in glossiness were evaluated although not described in the tables. Neither glossiness nor deviations in glossiness were observed in the entire image, neither abrasion resistance nor water resistance were achieved, and a useful recorded product was not able to be obtained. It was discovered on the basis of this that the embodiment was useful in a case in which recording was performed on a low-absorbable or non-absorbable recording medium with excellent abrasion resistance or the like.

Further, deviations in glossiness tended not to occur as recording was performed on a recording medium with a narrower width in the main scanning direction when a recording medium with a different width in the main scanning direction was created by cutting or attaching the recording medium 1, a recording pattern with a width of a remaining portion after leaving margins of 2 cm at both ends of the recording medium in the main scanning direction was recorded, recording was similarly performed thereon, and deviations in glossiness were evaluated although not described in the tables. This was estimated to be because time required to perform main scanning once became longer, and it took a longer time before the next ink compositions adhered through the next main scanning, as the width of the recording medium in the main scanning direction was wider, differences occurred in degrees of proceeding of the aggregation of the constituents in the ink compositions on the recording medium with the processing solution during the time, and deviations in glossiness tended to occur. When the test was conducted using the recording medium with the width of 40 cm, in particular, the width in the main scanning direction was narrow, and it was not possible to obtain a recorded product useful for display, although reduction of deviations in glossiness was satisfactory even under the conditions in Comparative Example 1. On the basis of this, it was discovered that the embodiment was particularly useful since excellent reduction of deviations in glossiness was achieved even in a case in which recording was performed on a recording medium with a wide width in the main scanning direction.

The entire disclosure of Japanese Patent Application No. 2018-033504, filed Feb. 27, 2018 is expressly incorporated by reference herein.

What is claimed is:

1. An ink jet recording method that is performed on a low-absorbable or non-absorbable recording medium using a processing solution that contains a colored ink composition containing a coloring material, a clear ink composition containing resin, and an aggregating agent for aggregating constituents in the colored ink composition, the method comprising:

causing the processing solution that contains the aggregating agent to adhere to the recording medium; and causing ink to adhere through main scanning in which the colored ink composition and the clear ink composition are ejected while relative positions of a carriage with an ink jet head mounted thereon and the recording medium are changed in a main scanning direction and sub scanning in which the relative positions of the carriage and the recording medium are changed to a sub scanning direction that intersects the main scanning direction, wherein the main scanning that involves a region where a recording region in which the colored ink composition is ejected from the ink jet head in the main scanning and a recording region in which the clear ink composition is ejected in the same main scanning overlap with one another is performed, in the region, the colored ink composition and the clear ink composition overlap with one another in the same main scanning on the recording medium, the colored ink composition and the clear ink composition are each water-based inks, and wherein the resin that is contained in the clear ink containers resin in which an average particle diameter increase rate is equal to or less than 5 times when 0.3M aqueous magnesium sulfate solution is mixed at a mass ration of 1:1 in a water-mediated solution containing 1% by mass of resin.

2. The ink jet recording method according to claim 1, wherein the main scanning that involves the overlapping region further has a region where the recording region in which the clear ink composition is ejected from the ink jet head in the main scanning does not overlap with the recording region in which the colored ink composition is ejected from the ink jet head in the main scanning in the sub scanning direction.

3. The ink jet recording method according to claim 2, wherein the overlapping region is located on a downstream side of the non-overlapping region in the sub scanning direction.

4. The ink jet recording method according to claim 1, wherein the clear ink composition contains wax.

5. The ink jet recording method according to claim 1, further comprising:

heating the recording medium, wherein the causing of the ink to adhere is performed on the heated recording medium.

6. The ink jet recording method according to claim 1, wherein the processing solution is caused to adhere to the recording region, in which the colored ink composition is ejected from the ink jet head in the main scanning, before or in the main scanning.

7. The ink jet recording method according to claim 1, wherein the recording region has a region in which an amount of adhering processing solution is 5 to 20 parts by mass with respect to 100 parts by mass of the adhering colored ink composition.

8. The ink jet recording method according to claim 1, wherein the recording region has a region in which an amount of adhering clear ink composition is 10 to 60 parts by mass with respect to 100 parts by mass of the adhering colored ink composition.

9. The ink jet recording method according to claim 1, wherein the colored ink composition contains a nitrogen-containing solvent.

10. The ink jet recording method according to claim 1, wherein the aggregating agent is a polyvalent metal salt, an organic acid, or a cationic polymer.

11. The ink jet recording method according to claim 1, wherein a width of the recording medium in the main scanning direction is equal to or greater than 50 cm.

12. A recording apparatus that performs recording by the ink jet recording method according to claim 1, the apparatus comprising:

an ink jet head that ejects the colored ink composition; and an ink jet head that ejects the clear ink composition, wherein there is a region where an ejection region of the ink jet head that ejects the colored ink composition and an ejection region of the ink jet head that ejects the clear ink composition overlap with one another in the sub scanning direction.

13. A recording apparatus that performs recording by the ink jet recording method according to claim 2, the apparatus comprising:

an ink jet head that ejects the colored ink composition; and an ink jet head that ejects the clear ink composition, wherein there is a region where an ejection region of the ink jet head that ejects the colored ink composition and an ejection region of the ink jet head that ejects the clear ink composition overlap with one another in the sub scanning direction.

14. A recording apparatus that performs recording by the ink jet recording method according to claim 3, the apparatus comprising:

an ink jet head that ejects the colored ink composition; and an ink jet head that ejects the clear ink composition, wherein there is a region where an ejection region of the ink jet head that ejects the colored ink composition and an ejection region of the ink jet head that ejects the clear ink composition overlap with one another in the sub scanning direction.

15. A recording apparatus that performs recording by the ink jet recording method according to claim 4, the apparatus comprising:

an ink jet head that ejects the colored ink composition; and an ink jet head that ejects the clear ink composition, wherein there is a region where an ejection region of the ink jet head that ejects the colored ink composition and an ejection region of the ink jet head that ejects the clear ink composition overlap with one another in the sub scanning direction.

16. A recording apparatus that performs recording by the ink jet recording method according to claim 5, the apparatus comprising:

an ink jet head that ejects the colored ink composition; and an ink jet head that ejects the clear ink composition, wherein there is a region where an ejection region of the ink jet head that ejects the colored ink composition and an ejection region of the ink jet head that ejects the clear ink composition overlap with one another in the sub scanning direction.

17. A recording apparatus that performs recording by the ink jet recording method according to claim 6, the apparatus comprising:

an ink jet head that ejects the colored ink composition; and an ink jet head that ejects the clear ink composition, wherein there is a region where an ejection region of the ink jet head that ejects the colored ink composition and an ejection region of the ink jet head that ejects the clear ink composition overlap with one another in the sub scanning direction.

18. The ink jet recording method according to claim 1, wherein the number of times of the main scanning performed with the clear ink composition is less than the number of times of the main scanning performed with the colored ink composition at a specific location in the recording region.

19. The ink jet recording method according to claim 1, further comprising heating the recording medium to a temperature in a range of 50 to 150° C. after causing the ink to adhere to the recording medium.

20. An ink jet recording method that is performed on a low-absorbable or non-absorbable recording medium using a processing solution that contains a colored ink composition containing a coloring material, a clear ink composition containing resin, and an aggregating agent for aggregating constituents in the colored ink composition, the method comprising:
- causing the processing solution that contains the aggregating agent to adhere to the recording medium; and
- causing ink to adhere through main scanning in which the colored ink composition and the clear ink composition are ejected while relative positions of a carriage with an ink jet head mounted thereon and the recording medium are changed in a main scanning direction and sub scanning in which the relative positions of the carriage and the recording medium are changed to a sub scanning direction that intersects the main scanning direction,
- wherein the main scanning that involves a region where a recording region in which the colored ink composition is ejected from the ink jet head in the main scanning and a recording region in which the clear ink composition is ejected in the main scanning overlap with one another is performed, and
- wherein the resin that is contained in the clear ink contains resin in which an average particle diameter increase rate is equal to or less than 5 times when 0.3M aqueous magnesium sulfate solution is mixed at a mass ratio of 1:1 in a water-mediated solution containing 1% by mass of resin.

* * * * *